US012673390B2

(12) United States Patent　　(10) Patent No.:　US 12,673,390 B2

Komatsu et al.　　(45) Date of Patent:　Jul. 7, 2026

---

(54) REPAIR WELDING SYSTEM, REPAIR WELDING METHOD, INSPECTION DEVICE, AND ROBOT CONTROL DEVICE

(71) Applicant: Panasonic Intellectual Property Management Co., Ltd., Osaka (JP)

(72) Inventors: Takamichi Komatsu, Osaka (JP); Toshinari Mohri, Osaka (JP); Ryutaro Monden, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/917,361

(22) Filed: Oct. 16, 2024

(65) Prior Publication Data

US 2025/0033149 A1　　Jan. 30, 2025

Related U.S. Application Data

(60) Division of application No. 17/562,488, filed on Dec. 27, 2021, now Pat. No. 12,145,219, which is a (Continued)

(30) Foreign Application Priority Data

Jun. 28, 2019　(JP) ................................. 2019-122372

(51) Int. Cl.
　*B23K 31/00*　　(2006.01)
　*B23K 9/095*　　(2006.01)
　　(Continued)

(52) U.S. Cl.
　CPC .......... *B23K 31/125* (2013.01); *B23K 9/0956* (2013.01); *B25J 9/1687* (2013.01); *B25J 11/005* (2013.01)

(58) Field of Classification Search
　CPC .. B23K 31/125; B23K 9/0956; B23K 9/0953; B23K 9/095; G05B 2219/45104;
　　(Continued)

(56) References Cited

U.S. PATENT DOCUMENTS

2006/0213888 A1* 9/2006 Suzuki ................... B23K 9/095
　　　　　　　　　　　　　　　　　219/130.01
2010/0314362 A1* 12/2010 Albrecht ................ B23K 37/00
　　　　　　　　　　　　　　　　　219/121.63

(Continued)

FOREIGN PATENT DOCUMENTS

JP　　2000-167666　　6/2000
JP　　2006-247663　　9/2006

(Continued)

OTHER PUBLICATIONS

International Search Report issued Sep. 24, 2020 in International (PCT) Application No. PCT/JP2020/024242.

(Continued)

*Primary Examiner* — Erin B Saad

(74) *Attorney, Agent, or Firm* — Wenderoth, Lind & Ponack, L.L.P.

(57)　　　　　　ABSTRACT

A repair welding system includes an inspection device configured to inspect an appearance of a welded portion of a workpiece, and a robot control device that controls a robot configured to weld the workpiece. The inspection device determines whether there is a defective portion among welded portions of the workpiece based on a predetermined standard, and sets one of a plurality of defect ranks to the defective portion in a case that the defective portion is detected. The robot control device generates a repair welding program corresponding to the defect rank, and instructs (Continued)

the robot to execute, in accordance with the repair welding program, a repair welding on the defective portion to which the defect rank is set.

7 Claims, 13 Drawing Sheets

Related U.S. Application Data continuation of application No. PCT/JP2020/024242, filed on Jun. 19, 2020.

(51) Int. Cl.
*B23K 31/12* (2006.01)
*B25J 9/16* (2006.01)
*B25J 11/00* (2006.01)

(58) Field of Classification Search
CPC .... G05B 19/41875; G05B 2219/32228; G05B 2219/32237; G05B 2219/45066; G05B 2219/45135; G05B 19/0425
See application file for complete search history.

(56) References Cited

U.S. PATENT DOCUMENTS

2013/0206741 A1* 8/2013 Pfeifer ................... G01S 17/58
356/28

| 2013/0341311 | A1  | 12/2013 | Albrecht | |
| 2019/0160601 | A1* | 5/2019  | Daniel   | B23K 9/127 |
| 2020/0276674 | A1* | 9/2020  | Lee      | B23K 31/125 |
| 2020/0316703 | A1* | 10/2020 | Matsuoka | B23K 9/09 |
| 2021/0283704 | A1* | 9/2021  | Davidson | G05B 19/414 |
| 2022/0097178 | A1* | 3/2022  | Mohri    | B23K 9/095 |
| 2022/0097225 | A1* | 3/2022  | Komatsu  | B25J 9/0084 |
| 2022/0118558 | A1* | 4/2022  | Komatsu  | B25J 9/1687 |
| 2022/0118559 | A1* | 4/2022  | Mohri    | B25J 11/005 |
| 2022/0120697 | A1* | 4/2022  | Hanada   | G01N 21/95 |
| 2022/0226923 | A1* | 7/2022  | Hanada   | G05B 19/4183 |

FOREIGN PATENT DOCUMENTS

| JP | 2010-253538 | 11/2010 |
| JP | 2012-037487 | 2/2012 |

OTHER PUBLICATIONS

Written Opinion of the International Searching Authority issued Sep. 24, 2020 in International (PCT) Application No. PCT/JP2020/024242.

Extended European Search Report issued Aug. 24, 2022 in corresponding European Patent Application No. 20831448.4.

Chinese Office Action issued Dec. 1, 2023 in corresponding Chinese Patent Application No. 202080047017.6, together with English translation thereof.

* cited by examiner

| INSPECTION SCORE | DEFECT RANK | DESCRIPTION OF DEFECT RANK | TREATMENT OF REPAIR WELDING |
|---|---|---|---|
| 60~79 | NG1 | MINOR DEFECT (CAN BE CORRECTED BY REPAIR WELDING) | EXECUTE NORMAL REPAIR WELDING |
| 40~59 | NG2 | SEVERE DEFECT (DIFFICULT TO BE CORRECTED BY REPAIR WELDING) | EXECUTE REPAIR WELDING AND INSPECTION PREFERENTIALLY FOR DEFECTIVE PORTION OF NG2 |
| 20~39 | NG3 | DIFFICULT TO BE CORRECTED BY REPAIR WELDING OF WELDING ROBOT | NOTIFY THAT REPAIR WELDING IS NOT EXECUTED BY WELDING ROBOT |
| 0~19 | NG4 | REPAIR WELDING IS IMPOSSIBLE | DO NOT EXECUTE REPAIR WELDING |

*FIG. 4B*

WDB2

NGD24 ‹NG3›

NGD23 ‹NG1›

WDL2

NGD22 ‹NG1›

NGD21 ‹NG2›

FIG. 7A

PROGRAM GENERATION LOGIC TABLE (CHARACTERISTIC DATA)

| DEFECT TYPE | CHARACTERISTIC DATA | CORRECTION TYPE | CORRECTION PARAMETER |
|---|---|---|---|
| NOTCH | ~5 | REPAIR WELDING | data1(A,V,S,···) |
| NOTCH | 5~8 | REPAIR WELDING (CHANGE IN THE MIDDLE) | data2(A,V,S,···) data3(A,V,S,···) |
| ··· | ··· | ··· | ··· |
| CUT | ~3 | SIMILAR TO MAIN WELDING | — |
| CUT | 3~6 | REPAIR WELDING | data4(A,V,S,····) |
| ··· | ··· | ··· | ··· |
| HOLE | ~2 | REPAIR WELDING | data5(A,V,S,···) |
| HOLE | 2~4 | REPAIR WELDING (TWICE) | data6(A,V,S,···) data7(A,V,S,···) |
| ··· | ··· | ··· | ··· |

*FIG. 7B*

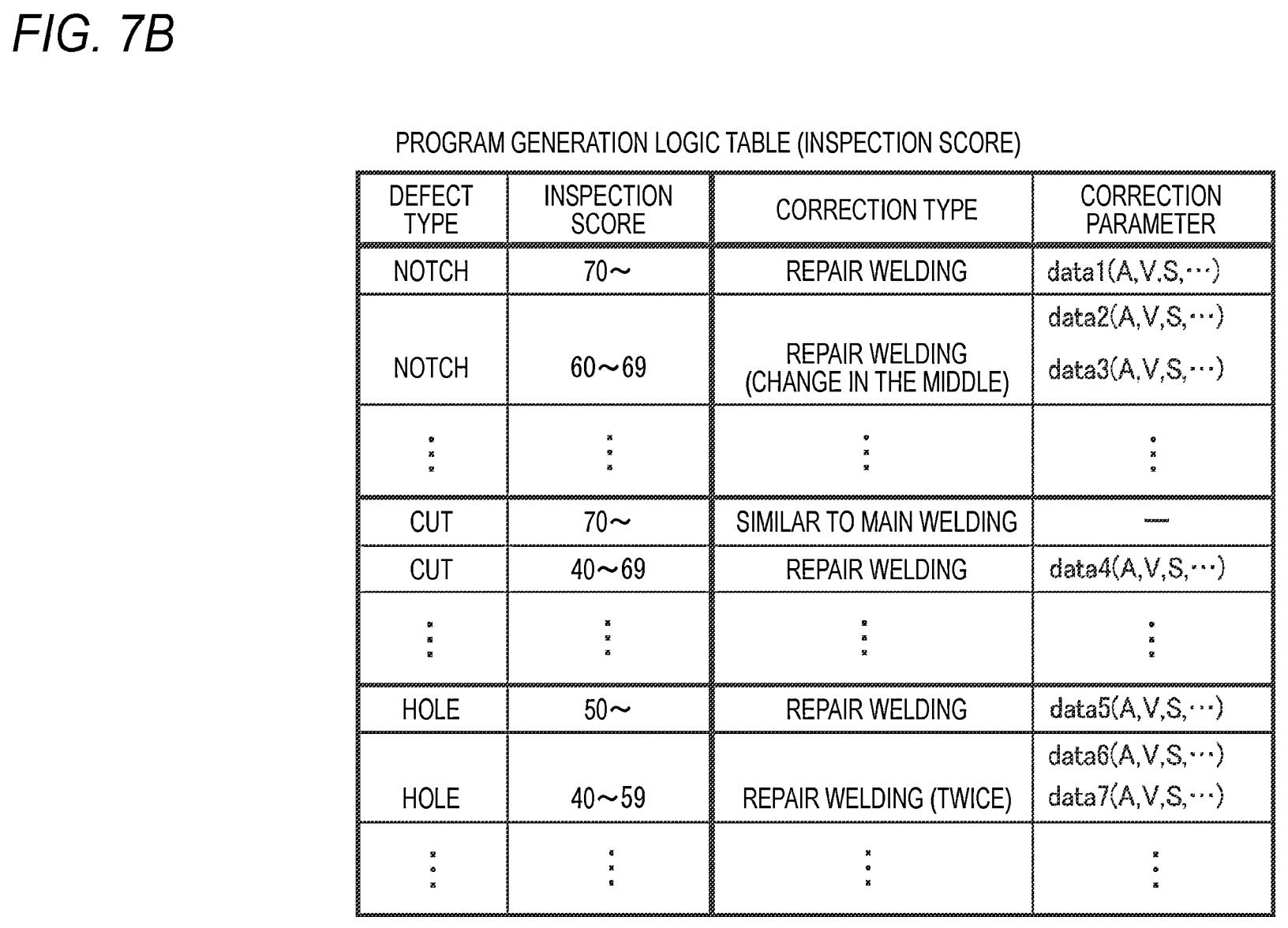

PROGRAM GENERATION LOGIC TABLE (INSPECTION SCORE)

| DEFECT TYPE | INSPECTION SCORE | CORRECTION TYPE | CORRECTION PARAMETER |
|---|---|---|---|
| NOTCH | 70~ | REPAIR WELDING | data1(A,V,S,⋯) |
| NOTCH | 60~69 | REPAIR WELDING (CHANGE IN THE MIDDLE) | data2(A,V,S,⋯) data3(A,V,S,⋯) |
| ⋯ | ⋯ | ⋯ | ⋯ |
| CUT | 70~ | SIMILAR TO MAIN WELDING | — |
| CUT | 40~69 | REPAIR WELDING | data4(A,V,S,⋯) |
| ⋯ | ⋯ | ⋯ | ⋯ |
| HOLE | 50~ | REPAIR WELDING | data5(A,V,S,⋯) |
| HOLE | 40~59 | REPAIR WELDING (TWICE) | data6(A,V,S,⋯) data7(A,V,S,⋯) |
| ⋯ | ⋯ | ⋯ | ⋯ |

REPAIR WELDING SYSTEM, REPAIR WELDING METHOD, INSPECTION DEVICE, AND ROBOT CONTROL DEVICE

CROSS-REFERENCE TO RELATED APPLICATIONS

This is a divisional application of U.S. application Ser. No. 17/562,488, filed on Dec. 27, 2021, which is a continuation of International Application No. PCT/JP2020/024242 filed on Jun. 19, 2020, and claims priority from Japanese Patent Application No. 2019-122372 filed on Jun. 28, 2019, the entire contents of which are incorporated herein by reference.

TECHNICAL FIELD

The present disclosure relates to a repair welding system, a repair welding method, an inspection device, and a robot control device.

BACKGROUND ART

JP-A-2012-37487 discloses a shape inspection device that inspects a shape of a weld bead using an imaging optical system and inspects a cross-sectional shape of the weld bead in a cross-sectional line by scanning the weld bead with slit light at a time. The shape inspection device projects slit light onto the weld bead, images shape lines sequentially formed on the weld bead by scanning the weld bead with the slit light, and acquires a three-dimensional shape of the weld bead as point cloud data based on imaging data of the sequentially formed shape lines. The shape inspection device sets a cutting line different from the shape lines formed by scanning the weld bead with the slit light in accordance with an input on the weld bead displayed based on the point cloud data, and calculates the cross-sectional shape of the weld bead at the cutting line based on the point cloud data corresponding to the cutting line.

SUMMARY OF INVENTION

The present disclosure provides a repair welding method, an inspection device, and a robot control device that can more efficiently execute a repair welding for a defective portion of a weld bead.

According to the present disclosure, there is provided a repair welding system. The repair welding system includes an inspection device configured to inspect an appearance of a welded portion of a workpiece, and a robot control device that controls a robot configured to weld the workpiece. The inspection device determines whether there is a defective portion among welded portions of the workpiece based on a predetermined standard, and sets one of a plurality of defect ranks to the defective portion in a case that the defective portion is detected. The robot control device generates a repair welding program corresponding to the defect rank, and instructs the robot to execute, in accordance with the repair welding program, a repair welding on the defective portion to which the defect rank is set.

According to the present disclosure, there is provided a repair welding method. The repair welding method is executed by a repair welding system including an inspection device configured to inspect an appearance of a welded portion of a workpiece and a robot control device that controls a robot configured to weld the workpiece. The repair welding method includes determining whether there is a defective portion among welded portions of the workpiece based on a predetermined standard, assigning one of a plurality of defect ranks to the defective portion in a case that the defective portion is detected, generating a repair welding program corresponding to the defect rank, and instructing the robot to execute, in accordance with the repair welding program, a repair welding on a defective portion specified by the defect rank.

According to the present disclosure, there is provided an inspection device configured to be connected to a robot control device for controlling a robot configured to weld a workpiece and configured to inspect an appearance of a welded portion of the workpiece. The inspection device includes a processing unit configured to determine whether there is a defective portion among welded portions of the workpiece based on a predetermined standard, and set one of a plurality of defect ranks to the defective portion in a case that the defective portion is detected, and a communication unit configured to send, to the robot control device, an instruction for generating a repair welding program corresponding to the defect rank and an instruction for instructing the robot to execute, in accordance with the repair welding program, a repair welding on the defective portion to which the defect rank is set.

According to the present disclosure, there is provided a robot control device configured to be connected to an inspection device configured to inspect an appearance of a welded portion of a workpiece and that controls a robot configured to weld the workpiece. The robot control device includes a communication unit configured to receive information about one of a plurality of defect ranks set to a defective portion among welded portions of the workpiece in a case that the defective portion is detected by the inspection device based on a predetermined standard, a generation unit configured to generate a repair welding program corresponding to the defect rank, and a control unit configured to instruct the robot to execute, in accordance with the repair welding program, a repair welding on the defective portion to which the defect rank is set.

According to the present disclosure, a repair welding on a defective portion of a weld bead can be executed more efficiently.

BRIEF DESCRIPTION OF DRAWINGS

FIG. 2 is a diagram showing an example of an internal configuration of a repair welding system related to control of an inspection and repair welding robot according to the first embodiment.

FIG. 3 is a diagram showing an example of a treatment determination table indicating treatment contents of a repair welding corresponding to a defect rank.

FIG. 4B is a diagram schematically showing a second example of defect ranks of welded portions of a weld bead after a main welding.

3

Figure 6:
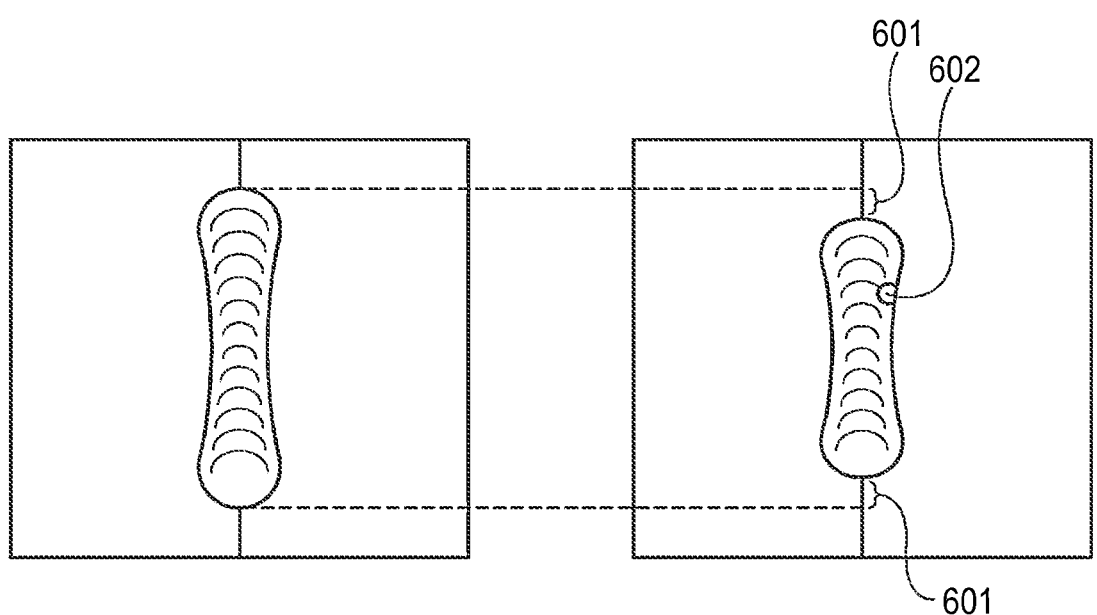

FIG. 6 is a diagram conceptually showing a comparison between master data and shape data of a weld bead after a main welding.

FIG. 7A is a diagram showing an example of a program generation logic table corresponding to a defect type and specific data.

FIG. 7B is a diagram showing an example of a program generation logic table corresponding to a defect type and an inspection score.

Figure 8:
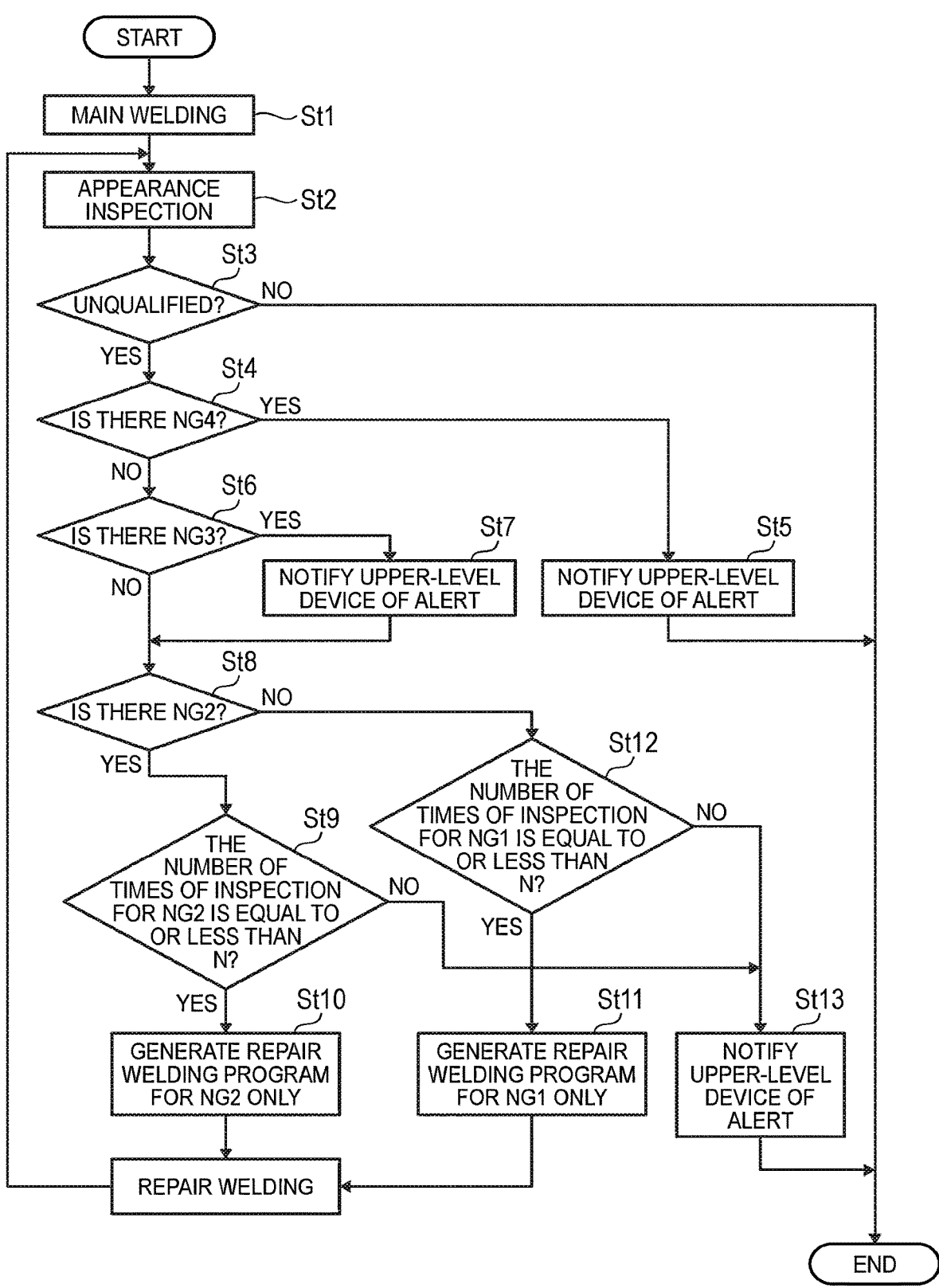

FIG. 8 is a flowchart showing an example of a processing procedure of the repair welding system according to the first embodiment.

Figure 9:
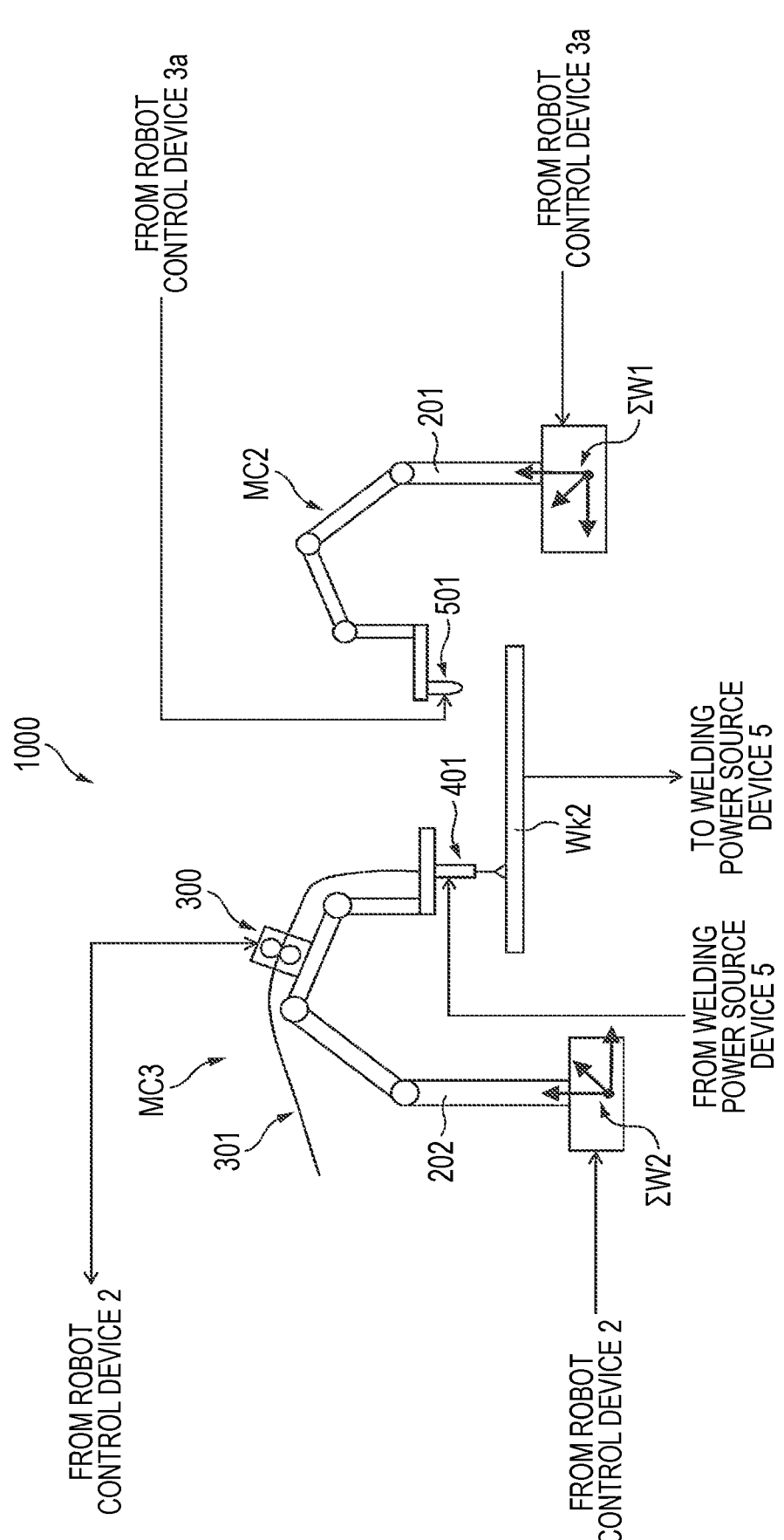

FIG. 9 is a diagram showing an example of an internal configuration of a repair welding system related to the control of an inspection robot and a repair welding robot according to a second embodiment.

Figure 10:
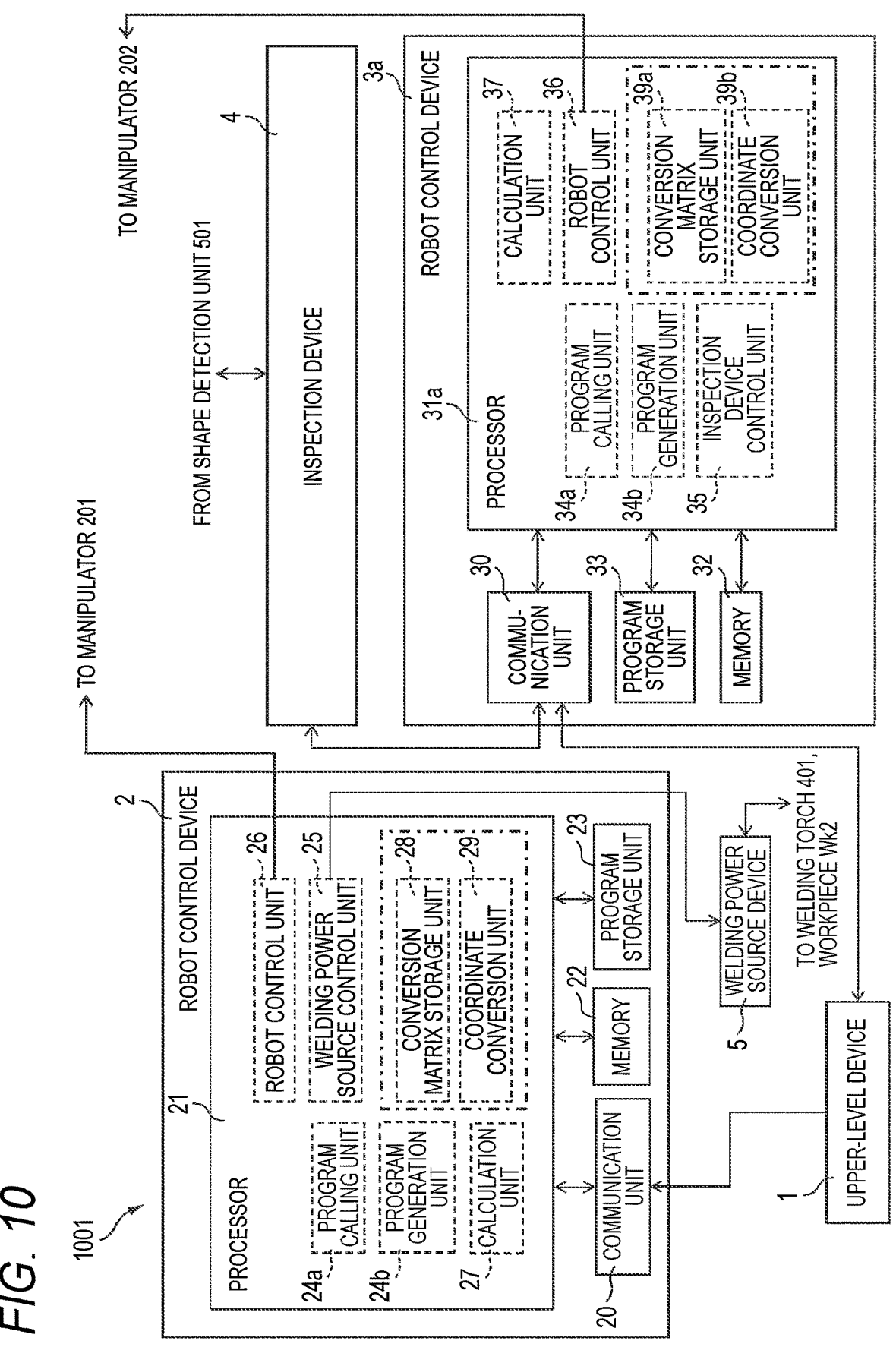

FIG. 10 is a diagram showing an example of an internal configuration of a repair welding system related to the control of the inspection robot and the repair welding robot according to the second embodiment.

DESCRIPTION OF EMBODIMENTS (Background Leading to Embodiments of the Present Disclosure)

According to the technique disclosed in JP-A-2012-37487, the shape inspection device can execute, for example, a quality determination of a shape of a welded portion after a main welding is executed. However, in a case where the shape of the welded portion is not good, a current situation is that a manual operation (that is, performed by a welding operator) is needed for a repair welding for correction and a determination of determining whether the welded portion can be corrected by a re-welding (that is, the welding is executed again in order to correct a defective welded portion and hereinafter, referred to as a "repair welding"). Therefore, welding quality may not be stable due to an individual difference or an erroneous determination of a welding operator of a certain skill level.

Therefore, for example, a repair welding method, an inspection device, and a robot control device that can more efficiently execute a repair welding on a defective portion among welded portions (for example, a weld bead) after a main welding will be described in the following embodiments.

Hereinafter, embodiments specifically disclosing a repair welding system, a repair welding method, an inspection device, and a robot control device according to the present disclosure will be described in detail with reference to the drawings as appropriate. Unnecessarily detailed description may be omitted. For example, detailed description of a well-known matter or repeated description of substantially the same configuration may be omitted. This is to avoid unnecessary redundancy in the following description and to facilitate understanding for those skilled in the art. It should be noted that the accompanying drawings and the following description are provided to enable those skilled in the art to fully understand the present invention, and are not intended to limit the range of the claims.

(Example of System Configuration Common to First and Second Embodiments)

Figure 1:
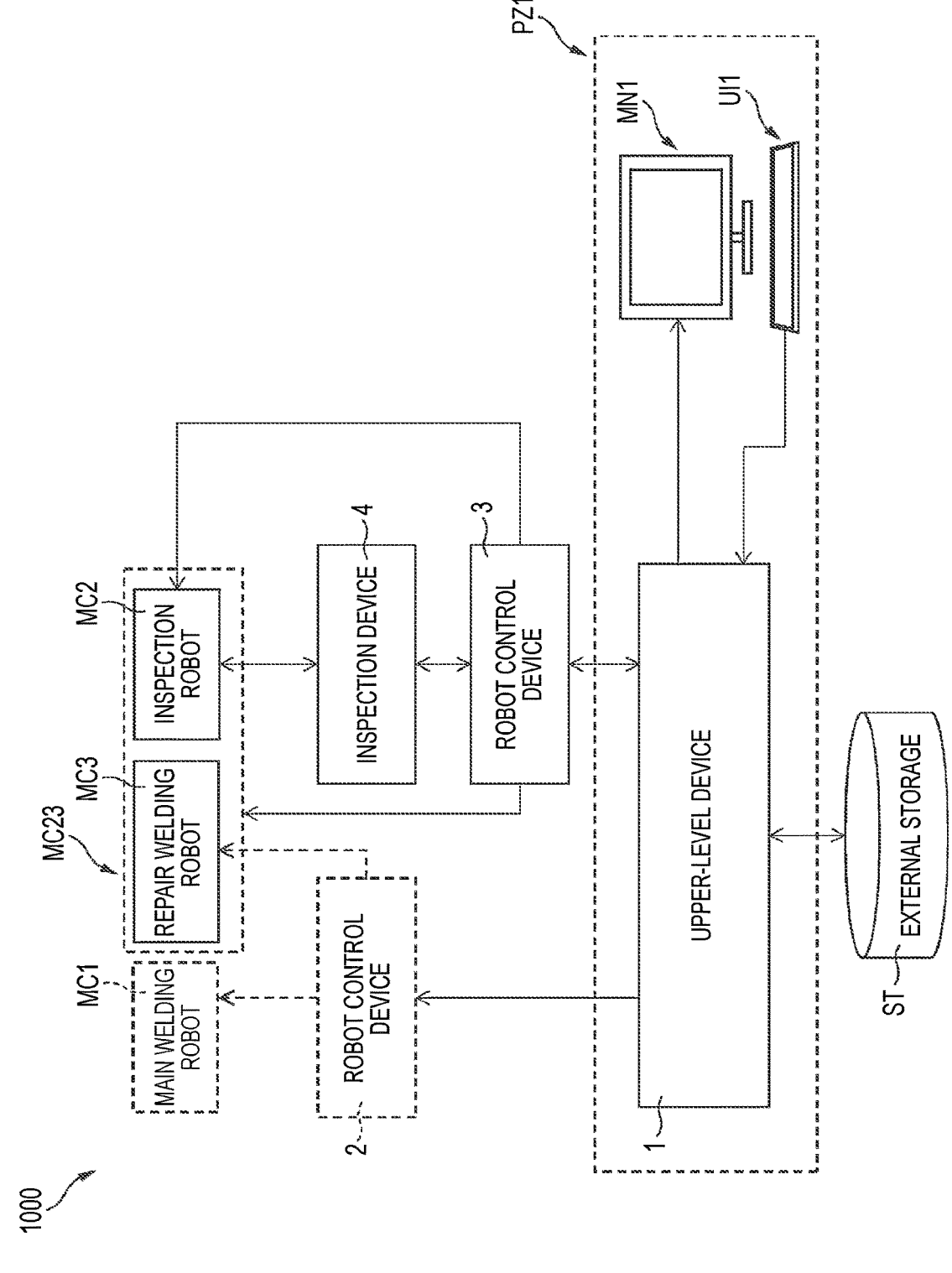
FIG. 1 is a schematic diagram showing an example of a system configuration of a repair welding system.

FIG. 1 is a schematic diagram showing an example of a system configuration of a repair welding system 1000. The repair welding system 1000 automatically executes an appearance inspection on a welded portion of a welded workpiece Wk1 based on information input by a user (for example, a welding operator or a system administrator) or preset welding information, and automatically executes a correction welding (that is, the repair welding) on a defective portion that is determined to be defective in a main welding among welded portions according to a result of the appearance inspection. The repair welding system 1000 may automatically execute the welding described above in addition to the appearance inspection and the repair welding described above.

Roughly speaking, the repair welding system 1000 includes a robot for executing a welding (for example, the main welding and the repair welding) and a robot for executing an appearance inspection on a welding result, a controller that controls a processing of the robots and processes a result of the appearance inspection, and an upper-level device that transmits various commands to the controller.

Specifically, the repair welding system 1000 includes, as the above-described robots, a main welding robot MC1 that executes a main welding, an inspection robot MC2 that executes an appearance inspection on a welded portion after the main welding, and a repair welding robot MC3 that executes a repair welding in a case where a defective portion is included in the welded portions after the main welding in accordance with a result of the appearance inspection. The repair welding system 1000 includes robot control devices 2 and 3 and an inspection device 4 as the above-described controller. The repair welding system 1000 includes an upper-level device 1 as the upper-level device described above. A monitor MN1, an input interface UI1, and an external storage ST may be connected to the upper-level device 1.

Although not shown, the upper-level device 1 or the robot control devices 2 and 3 may further include a communication interface that executes communication (for example, wired communication or wireless communication) with an external network. When the upper-level device 1 or the robot control devices 2 and 3 are connected to an external network, the upper-level device 1 or the robot control devices 2 and 3 can communicate with other devices (for example, a server, a PC, various sensor devices, and the like) that are present in the external network.

In FIG. 1, the main welding robot MC1 is shown as a separate body from the repair welding robot MC3. When a main welding is executed using a system different from the repair welding system 1000, or when the repair welding system 1000 executes the appearance inspection and the repair welding after a welding operator manually performs a main welding, the main welding robot MC1 may be omitted.

The main welding robot MC1 may be configured integrally with either the inspection robot MC2 or the repair welding robot MC3. For example, the repair welding robot MC3 can be treated as the main welding robot MC1, and may execute both a main welding for welding the workpiece Wk1 and a repair welding for correcting a defective portion among welded portions welded by the main welding. Similarly, for example, the inspection robot MC2 can be treated as the main welding robot MC1, and may execute both a main welding for welding the workpiece Wk1 and an appearance inspection for determining whether there is a defective portion that does not satisfy a predetermined welding standard among welded portions welded by the main welding.

The inspection robot MC2 and the repair welding robot MC3 may be integrated into a single robot (that is, an inspection and repair welding robot MC23). In order to make the description easy to understand, an inspection and repair welding robot MC23 in which the inspection robot MC2 and the repair welding robot MC3 are integrated will be described as an example in a first embodiment to be described below, and a configuration in which the inspection robot MC2 and the repair welding robot MC3 are separate bodies will be described as an example in a second embodiment to be described below. The main welding robot MC1, the inspection robot MC2, and the repair welding robot MC3 may be integrated into one robot.

In the repair welding system 1000, the number of each of the main welding robot MC1, the inspection robot MC2, and the repair welding robot MC3 is not limited to the number shown in FIG. 1. For example, there may be a plurality of the welding robots MC1, the inspection robots MC2, and the repair welding robots MC3, and the numbers of the main welding robot MC1, the inspection robot MC2, and the repair welding robot MC3 may be the same or may be different. For example, the repair welding system 1000 may include one main welding robot MC1, three inspection robots MC2, and two repair welding robots MC3. Accordingly, the repair welding system 1000 can be configured adaptively according to the purpose of the system configuration (for example, processing ranges or processing speeds of various robots).

The upper-level device 1 is communicably connected to the monitor MN1, the input interface UI1, the external storage ST, and the robot control devices 2 and 3. Although the upper-level device 1 is connected to the inspection device 4 via the robot control device 3 in FIG. 1, the upper-level device 1 may be directly connected to the inspection device 4 in a communicable manner without passing through the robot control device 3. The upper-level device 1 may include a terminal device PZ1 that includes the monitor MN1 and the input interface UI1 in an integrated manner, and may further include the external storage ST in an integrated manner. In this case, the terminal device PZ1 is, for example, a personal computer (PC) that is used by a user (see the above description) before a main welding is executed. The terminal device PZ1 is not limited to the PC described above, and may be a computer device having a communication function, such as a smartphone, a tablet terminal and a personal digital assistant (PDA).

The upper-level device 1 generates a control signal for executing each of the main welding of the workpiece Wk1, the appearance inspection of the welded portions of the workpiece Wk1, and the repair welding of the defective portion (see the above description) among the welded portions of the workpiece Wk1, based on an input operation of a user or information preset by a user. The upper-level device 1 transmits a control signal related to the execution of the main welding of the workpiece Wk1 to the robot control device 2. The upper-level device 1 transmits, to the robot control device 3, a control signal related to the execution of the appearance inspection on the welded portions of the workpiece Wk1, and a control signal related to the execution of the repair welding on the defective portion among the welded portions of the workpiece Wk1.

The upper-level device 1 may collect, via the robot control device 3, an appearance inspection result of the welded portions that is received from the inspection device 4. The upper-level device 1 may store the collected appearance inspection result in the external storage ST or output the collected appearance inspection result to the monitor MN1 to display the collected appearance inspection result. Although the inspection device 4 shown in FIG. 1 is connected to the upper-level device 1 via the robot control device 3, a connection form is not limited to that shown in FIG. 1. That is, the inspection device 4 and the upper-level device 1 may be directly connected to each other in a communicable manner.

The monitor MN1 may be configured with a display device such as a liquid crystal display (LED) or an organic electroluminescence (EL). The monitor MN1 displays an appearance inspection result of the welded portions that is transmitted from the robot control device 3 or an alert screen to be described later. Instead of the monitor MN1, a speaker (not shown) may be connected to the upper-level device 1 together with the monitor MN1, and contents on the alert screen may be output by voice via the speaker.

The input interface UI1 is a user interface that detects an input operation of a user and outputs the input operation to the upper-level device 1, and may be configured with, for example, a mouse, a keyboard, a touch panel, or the like. The input interface UI1 receives, for example, designation of a welding line to the workpiece Wk1, setting of an appearance inspection standard according to the welding line, an operation of starting or ending a processing of the repair welding system 1000, and the like, and outputs these pieces of information to the upper-level device 1.

The external storage ST is configured with, for example, a hard disk drive or a solid state drive (SSD). The external storage ST may store the appearance inspection result of the welded portions that is received by the upper-level device 1, or data or information indicating contents on the alert screen.

The robot control device 2 is communicably connected to each of the upper-level device 1 and the main welding robot MC1. The robot control device 2 receives control information that is related to the execution of the main welding and is transmitted from the upper-level device 1, and controls the main welding robot MC1 based on the control information to execute the main welding on the workpiece Wk1. The robot control device 2 may send a notification indicating that the main welding of the workpiece Wk1 is completed to the upper-level device 1. Accordingly, the upper-level device 1 can recognize that the main welding of the workpiece Wk1 is completed based on the notification transmitted from the robot control device 2.

The robot control device 3 is communicably connected to each of the upper-level device 1, the inspection device 4, the inspection robot MC2, and the repair welding robot MC3. The robot control device 3 receives information (for example, position information of a welded portion) that is related to a welded portion of the workpiece Wk1 and is transmitted from the upper-level device 1. The welded portion includes a portion where the workpiece Wk1 is welded by a main welding and a portion where the workpiece Wk1 is corrected and welded by a repair welding. The robot control device 3 controls the inspection robot MC2 based on the received information about the welded portion of the workpiece Wk1 to detect a shape of a weld bead in the welded portion. The robot control device 3 transmits the received information about the welded portion of the workpiece Wk1 to the inspection device 4 that inspects an appearance of a shape of the welded portion. The robot control device 3 transmits an appearance inspection result received from the inspection device 4 to the upper-level device 1.

The robot control device 3 receives control information that is related to the execution of the repair welding on the workpiece Wk1 and is transmitted from the upper-level device 1, controls the repair welding robot MC3 based on the control information, and executes a repair welding on a defective portion that is determined as a welding defect by the inspection device 4 among the welded portions of the workpiece Wk1.

The robot control device 3 controls each of the inspection robot MC2 and the repair welding robot MC3. Alternatively, for example, the inspection robot MC2 and the repair welding robot MC3 may be controlled using different control devices. Further, the main welding robot MC1, the inspection robot MC2, and the repair welding robot MC3 may be controlled by a single robot control device in the repair welding system 1000.

The inspection device 4 is communicably connected to each of the robot control device 3 and the inspection robot MC2. The inspection device 4 determines whether there is a welding defect in the welded portions based on the information about the welded portions transmitted from the robot control device 3 and shape data of the weld bead in the welded portion generated by the shape detection unit 500 (see FIG. 2) (appearance inspection). The inspection device 4 transmits information (for example, the information may include a defect section, position information of the defective section, and a defect factor) about a defective portion that is determined to be defective in a welding among the welded portions to the robot control device 3 as an appearance inspection result. When it is determined that the defective portion can be corrected by a repair welding of the repair welding robot MC3, the inspection device 4 also transmits information such as a correction type in the repair welding and a correction parameter for executing the repair welding to the robot control device 3 as the appearance inspection result. Although the robot control device 3 and the inspection device 4 are separate bodies In FIG. 1, the robot control device 3 and the inspection device 4 may be formed as a single device.

The main welding robot MC1 is communicably connected to the robot control device 2, and executes a main welding on the workpiece Wk1 in accordance with a main welding program prepared by the robot control device 2. In other words, when the main welding robot MC1 receives, from the robot control device 2, a control signal that is related to the execution of the main welding and includes information related to the welded portions and the main welding program, the main welding robot MC1 executes the main welding on the workpiece Wk1 based on the control signal.

The inspection robot MC2 is communicably connected to each of the robot control device 3 and the inspection device 4. The inspection robot MC2 executes an appearance inspection on the welded portions of the main welded workpiece Wk1 in accordance with an appearance inspection program prepared by the robot control device 3. In other words, when the inspection robot MC2 receives, from the robot control device 3, a control signal that is related to the execution of the appearance inspection and includes the information related to the welded portions and the appearance inspection program, the inspection robot MC2 acquires shape data of a weld bead in the welded portions of the main welded workpiece Wk1 based on the control signal.

The repair welding robot MC3 is communicably connected to the robot control device 2. The repair welding robot MC3 executes a repair welding on a defective portion among the welded portions of the workpiece Wk1 in accordance with a repair welding program generated by the robot control device 2. In other words, when the repair welding robot MC3 receives, from the robot control device 2, a control signal that is related to the execution of the repair welding and includes the information related to the defective portion and the repair welding program, the repair welding robot MC3 executes the repair welding on the defective portion of the workpiece Wk1 based on the control signal.

First Embodiment

Figure 2:
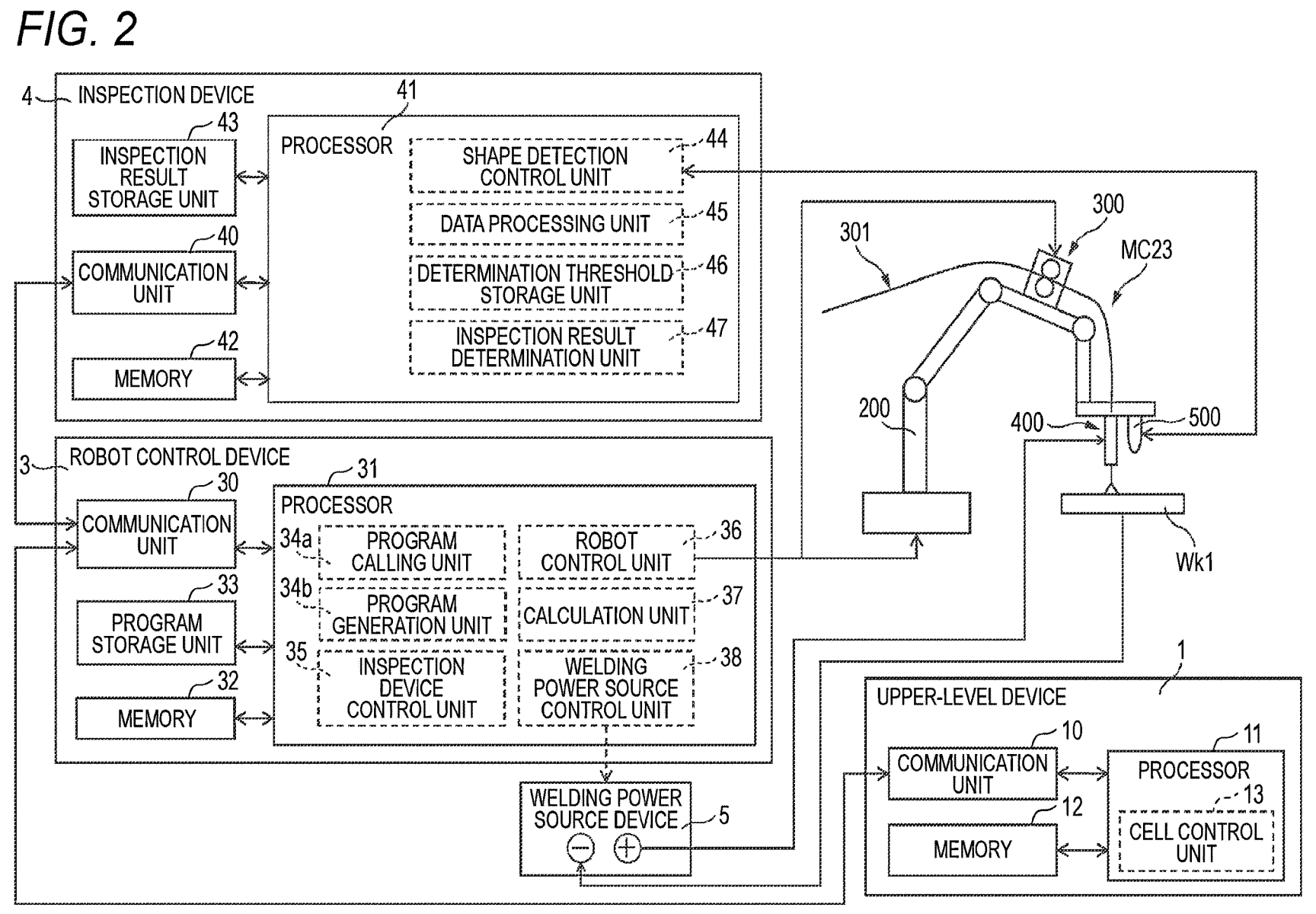

FIG. 2 is a diagram showing an example of an internal configuration of the repair welding system 1000 related to the control of the inspection and repair welding robot MC23 according to a first embodiment. The inspection and repair welding robot MC23 shown in FIG. 2 is a robot in which the inspection robot MC2 and the repair welding robot MC3 shown in FIG. 1 are integrated. In order to make the description easy to understand, configurations related to the monitor MN1, the input interface UI1, and the external storage ST are omitted.

[Configuration Example of Inspection and Repair Welding Robot MC23]

The inspection robot MC2 and the repair welding robot MC3 are implemented by one robot (that is, the inspection and repair welding robot MC23) in the first embodiment. An example in which a processing of the inspection and repair welding robot MC23 is controlled by the robot control device 3 will be described in the first embodiment.

The inspection and repair welding robot MC23 serving as an example of a robot executes an appearance inspection on the welded portions of the workpiece Wk1 after a main welding is executed, based on a control signal that is related to the appearance inspection and is transmitted from the robot control device 3. The inspection and repair welding robot MC23 automatically executes a repair welding on a defective portion among the welded portions of the workpiece Wk1 based on a control signal that is related to the execution of the repair welding and is transmitted from the robot control device 3.

The inspection and repair welding robot MC23 executes, for example, an arc welding. The inspection and repair welding robot MC23 may execute a welding (for example, a laser welding) other than an arc welding. In this case, although not shown, a laser head may be connected to a laser oscillator via an optical fiber instead of a welding torch 400.

The inspection and repair welding robot MC23 includes a manipulator 200, a wire feeding device 300, a welding wire 301, the welding torch 400, and a shape detection unit 500. The manipulator 200 includes an articulated arm, and moves each arm based on a control signal from a robot control unit 36 of the robot control device 3. As a result, the manipulator 200 can control positions of the welding torch 400 and the shape detection unit 500. An angle of the welding torch 400 relative to the workpiece Wk1 can be changed by moving the arm described above.

The wire feeding device 300 controls a feeding speed of the welding wire 301 based on a control signal from the robot control device 3. The wire feeding device 300 may include a sensor that can detect a remaining amount of the welding wire 301.

The welding wire 301 is held by the welding torch 400. When power is supplied from a welding power source device 5 to the welding torch 400, an arc is generated between a tip end of the welding wire 301 and the workpiece Wk1, and an arc welding is executed. The illustration and description of a configuration and the like for supplying shielding gas to the welding torch 400 are omitted for the convenience of description.

The shape detection unit 500 provided in the inspection and repair welding robot MC23 detects a shape of a weld bead in a welded portion (that is, executes an appearance inspection on the weld bead) based on a control signal from the robot control device 3, and acquires shape data of the weld bead based on a detection result. The inspection and repair welding robot MC23 transmits the acquired shape data of the weld bead to the inspection device 4.

The shape detection unit 500 is, for example, a three-dimensional shape measurement sensor, and includes a laser light source (not shown) that can scan the welded portions of the workpiece Wk1 based on position information of the welded portions transmitted from the robot control device 3, and a camera (not shown) that can image an imaging region including the periphery of a welded portion and image a reflection trajectory (that is, a shape line of the welded portion) of reflected laser light among laser light emitted to the welded portion. The shape detection unit 500 transmits shape data (in other words, image data) of the welded portion imaged by the camera based on the laser light to the inspection device 4.

The above-described camera includes at least a lens (not shown) and an image sensor (not shown). The image sensor is, for example, a solid-state imaging element such as a charge coupled device (CCD) or a complementary metal oxide semiconductor (CMOS), and converts an optical image formed on an imaging surface into an electric signal.

[Configuration Example of Upper-Level Device 1]

The upper-level device 1 serving as an example of a peripheral device generates a control signal for executing a main welding on the workpiece Wk1 based on an input operation by a user or information preset by the user, and transmits the control signal to the robot control device 2. The upper-level device 1 generates a control signal for executing an appearance inspection on the welded portions of the workpiece Wk1 and a control signal for executing a repair welding on a defective portion (see the above description) among the welded portions of the workpiece Wk1, and transmits the control signals to the robot control device 3. The upper-level device 1 includes a communication unit 10, a processor 11, and a memory 12.

The communication unit 10 is communicably connected to each of the robot control devices 2 and 3. The communication unit 10 transmits a control signal for executing a main welding on the workpiece Wk1 to the robot control device 2. The communication unit 10 transmits, to the robot control device 3, a control signal for executing an appearance inspection on the welded portions of the workpiece Wk1 or a control signal for executing a repair welding on the defective portion (see the above description) among the welded portions of the workpiece Wk1. Here, the control signal for executing the repair welding may include a control signal for controlling each of the manipulator 200, the wire feeding device 300, and the welding power source device 5.

The processor 11 is configured with, for example, a central processing unit (CPU) or a field programmable gate array (FPGA), and executes various processings and controls in cooperation with the memory 12. Specifically, the processor 11 implements a function of a cell control unit 13 by referring to a program and data stored in the memory 12 and executing the program.

The cell control unit 13 generates a control signal for executing a main welding on the workpiece Wk1, a control signal for executing an appearance inspection on the welded portions of the workpiece Wk1, and a control signal for executing a repair welding on the defective portion (see the above description) among the welded portions of the workpiece Wk1, based on an input operation of a user using the input interface UI1 and information that is preset by the user and stored in the external storage ST. The control signals generated by the cell control unit 13 are transmitted to the robot control device 2 or the robot control device 3 via the communication unit 10.

The memory 12 includes, for example, a random access memory (RAM) serving as a work memory used when each processing of the processor 11 is executed, and a read only memory (ROM) that stores a program and data for defining a processing of the processor 11. Data or information generated or acquired by the processor 11 is temporarily stored in the RAM. A program that defines a processing of the processor 11 is written into the ROM. The memory 12 stores an information type related to the workpiece Wk1, a workpiece S/N (Serial Number) assigned to each workpiece Wk1 in advance, a welding line ID assigned to each welded portion (for example, a welding line) set by a user, and the like.

[Configuration Example of Robot Control Device 3]

The robot control device 3 controls a processing of the inspection and repair welding robot MC23 (specifically, each of the manipulator 200, the wire feeding device 300, and the welding power source device 5) based on a control signal transmitted from the upper-level device 1. The robot control device 3 includes a communication unit 30, a processor 31, a memory 32, and a program storage unit 33. The processor 31 can implement functions of a program calling unit 34*a*, a program generation unit 34*b*, an inspection device control unit 35, the robot control unit 36, a calculation unit 37, and a welding power source control unit 38 in cooperation with the memory 32.

The communication unit 30 is communicably connected to each of the upper-level device 1, the inspection device 4, and the inspection and repair welding robot MC23. The communication unit 30 receives various control signals (for example, a control signal related to the execution of the appearance inspection on the welded portions of the workpiece Wk1 and a control signal related to the execution of the repair welding on the defective portion among the welded portions of the workpiece Wk1) transmitted from the upper-level device 1. The communication unit 30 transmits, to the inspection and repair welding robot MC23, a control signal related to the execution of the appearance inspection on the welded portions of the workpiece Wk1 and a control signal related to the execution of the repair welding on the defective portion among the welded portions of the workpiece Wk1. The communication unit 30 receives an appearance inspection result transmitted from the inspection device 4.

The processor 31 is configured with, for example, a CPU or an FPGA, and executes various processings and controls in cooperation with the memory 32. Specifically, the processor 31 implements functions of units by referring to a program and data stored in the memory 32 and executing the program. The units are the program calling unit 34*a*, the program generation unit 34*b*, the inspection device control unit 35, the robot control unit 36, the calculation unit 37, and the welding power source control unit 38.

The memory 32 includes, for example, a RAM serving as a work memory used when each processing of the processor 31 is executed, and a ROM that stores a program and data for defining a processing of the processor 31. Data or information generated or acquired by the processor 31 is temporarily stored in the RAM. A program that defines a processing of the processor 31 is written into the ROM.

The program storage unit 33 stores an appearance inspection program and a repair welding basic program to be executed by the inspection and repair welding robot MC23. The repair welding basic program is a basic program in which all of the welded portions of the workpiece Wk1 can be welded under the same welding conditions (for example, the welding conditions include a welding current A, a welding voltage V, and a welding speed S, and are not limited thereto) as those in the main welding, and the repair welding basic program is the same as the main welding program. The program storage unit 33 may store a repair welding program generated by editing the repair welding basic program by the program generation unit 34*b*.

The program calling unit 34*a* calls the repair welding basic program, the repair welding program, or the appearance inspection program stored in the program storage unit 33 or the RAM of the memory 32.

The program generation unit 34*b* serving as an example of a generation unit edits the repair welding basic program called by the program calling unit 34*a* based on information (for example, the appearance inspection result of the inspection device 4) that is related to the defective portion and is received from the inspection device 4 via the communication unit 30, and generates the repair welding program corresponding to the defective portion to which a defect rank is set. The program generation unit 34*b* may generate a repair welding program for each defective portion. Alternatively, when a plurality of defective portions having the same defect rank are detected, the program generation unit 34*b* may generate a repair welding program capable of collectively repairing and correcting all of the defective portions. That is, the program generation unit 34*b* generates a repair welding program that determines a defective portion to be subjected to a repair welding among all of welded portions of the workpiece Wk1 by using the information related to the defective portion (for example, a position of the defective portion, a defect rank, a defect factor, and a correction parameter for a repair welding). The generated repair welding program may be stored in the program storage unit 33 or may be stored in a RAM or the like in the memory 32.

Here, the repair welding program may include, as the correction parameter, various parameters such as a welding current, a welding voltage, an offset amount, a welding speed, and a posture of the welding torch 400 for controlling the welding power source device 5, the manipulator 200, the wire feeding device 300, the welding torch 400, the shape detection unit 500, and the like when a repair welding is executed.

The program generation unit 34*b* generates an appearance inspection program for executing an appearance inspection corresponding to a welded portion based on a control signal received from the upper-level device 1 via the communication unit 30. The program generation unit 34*b* generates the appearance inspection program called by the program calling unit 34*a* for each welded portion.

The inspection device control unit 35 serving as an example of a control unit generates a control signal (for example, a control signal related to the execution of an appearance inspection on a welded portion of the workpiece Wk1) for controlling a processing of the inspection device 4. The control signal is transmitted to the inspection device 4 via the communication unit 30. The inspection device control unit 35 receives and acquires various kinds of information (for example, an appearance inspection result of the inspection device 4) from the inspection device 4 via the communication unit 30, generates data or information (for example, an alert screen to be described later) based on the acquired information, and transmits the data or information to the upper-level device 1.

The robot control unit 36 serving as an example of a control unit drives the inspection and repair welding robot MC23 (specifically, the manipulator 200, the wire feeding device 300, and the welding power source device 5) based on the repair welding program or the appearance inspection program generated by the program generation unit 34*b*.

The calculation unit 37 serving as an example of a control unit executes various calculations. For example, the calculation unit 37 executes a calculation or the like for controlling the inspection and repair welding robot MC23 (specifically, the manipulator 200, the wire feeding device 300, and the welding power source device 5) controlled by the robot control unit 36 based on the repair welding program generated by the program generation unit 34*b*. The calculation unit 37 may calculate a surplus offset amount (for example, a surplus length for executing a repair welding that is longer than a range of a defective portion) to be added for executing a repair welding on a defective portion based on a position of the defective portion obtained as an appearance inspection result.

The welding power source control unit 38 serving as an example of a control unit drives the welding power source device 5 based on the repair welding program generated by the program generation unit 34*b* and a calculation result of the calculation unit 37.

[Configuration Example of Inspection Device 4]

The inspection device 4 inspects a welded portion of the workpiece Wk1 according to a predetermined standard. The predetermined standard includes a welding standard such as an appearance standard of a shape of a weld bead, a strength standard of a welded portion, a quality standard of a welded workpiece, and the like. In the following embodiments, the inspection device 4 executes an appearance inspection to determine whether a welded portion of the workpiece Wk1 satisfies a predetermined welding standard based on shape data of a weld bead in each welded portion. The shape data of the weld bead in each welded portion is acquired by the shape detection unit 500 of the inspection and repair welding robot MC23. In the following description, when it is determined that a welded portion among welded portions subjected to a main welding or a repair welding does not satisfy the predetermined welding standard, the welded portion is defined as a "defective portion". The inspection device 4 includes a communication unit 40, a processor 41, a memory 42, and an inspection result storage unit 43. The processor 41 can implement functions of a shape detection control unit 44, a data processing unit 45, a determination threshold storage unit 46, and an inspection result determination unit 47, in cooperation with the memory 42.

The communication unit 40 is communicably connected to each of the robot control device 3 and the inspection and repair welding robot MC23. The communication unit 40 may be directly connected to the upper-level device 1 in a communicable manner. The communication unit 40 receives information about a welded portion from the upper-level device 1 or the robot control device 3. The information about a welded portion may include, for example, a workpiece type, a workpiece S/N, a welding line ID, and the like. The communication unit 40 transmits data or information indicating an appearance inspection result of a welded portion from the inspection device 4 to the robot control device 3 or to the upper-level device 1 via the robot control device 3.

The processor 41 is configured with, for example, a CPU or an FPGA, and executes various processings and controls in cooperation with the memory 42. Specifically, the processor 41 implements functions of units by referring to a program and data stored in the memory 42 and executing the program. The units are the shape detection control unit 44, the data processing unit 45, the determination threshold storage unit 46, and the inspection result determination unit 47. When machine learning (refer to the following description) is executed prior to the execution of an appearance inspection processing, the processor 41 may include, for example, one or more graphics processing units (GPUs) having excellent calculation capability. In this case, the processor 41 may be used in combination with the CPU or the like described above.

The memory 42 includes, for example, a RAM serving as a work memory used when each processing of the processor 41 is executed, and a ROM that stores a program and data for defining a processing of the processor 41. Data or information generated or acquired by the processor 41 is temporarily stored in the RAM. A program that defines a processing of the processor 41 is written into the ROM. The memory 42 stores data of a treatment determination table (see FIG. 3) that is referred to when setting a defect rank according to inspection scores of the welded portions that are calculated by the processor 41 or when determining treatment contents of a repair welding corresponding to the defect rank.

Here, an example of the treatment determination table indicating treatment contents of a repair welding corresponding to a defect rank will be described with reference to FIG. 3. The treatment determination table is stored in, for example, the memory 42 of the inspection device 4. Alternatively, the treatment determination table may be stored in the memory 32 of the robot control device 3.

FIG. 3 is a diagram showing an example of the treatment determination table indicating treatment contents of a repair welding corresponding to a defect rank. As shown in FIG. 3, the treatment determination table stores an inspection score, a defect rank, description of a defect rank, and treatment contents of a repair welding in association with each other.

The inspection score indicates a score calculated when an appearance inspection is executed from the viewpoint of whether a welded portion of the workpiece Wk1 satisfies a predetermined welding standard. A correspondence relationship between the inspection score and the defect rank shown in FIG. 3 is merely an example, and it is needless to say that the correspondence relationship is not limited to the contents shown in FIG. 3.

The defect rank is determined in advance according to a value of the inspection score, and has, for example, four ranks (specifically, NG1, NG2, NG3, and NG4) in the present specification.

The defect ranks NG1, NG2, NG3, and NG4 are described in the description of the defect ranks.

The defect rank NG1 serving as an example of a second defect rank indicates that a welded portion for which the inspection score is calculated to be "60 to 79" is a minor defective portion. In other words, a defective portion of the defect rank NG1 can be corrected by a repair welding of the inspection and repair welding robot MC23.

The defect rank NG2 serving as an example of a first defect rank indicates that a welded portion for which the inspection score is calculated to be "40 to 59" is a severe defective portion. In other words, a defective portion of the defect rank NG2 is difficult to be corrected by a repair welding of the inspection and repair welding robot MC23.

The defect rank NG3 serving as an example of a third defect rank is set to a defective portion for which the inspection score is calculated to be "20 to 39", and indicates that the defective portion is difficult to be corrected by a repair welding of the inspection and repair welding robot MC23. In the first embodiment, the inspection device 4 generates an alert screen indicating that a repair welding on a defective portion of the defect rank NG3 is left to a manual repair welding to be performed by a welding operator instead of the inspection and repair welding robot MC23, and reports (notifies) the alert screen to the upper-level device 1.

The defect rank NG4 serving as an example of a fourth defect rank is set to a defective portion for which the inspection score is calculated to be "0 to 19", and indicates that the defective portion cannot be corrected by a repair welding of the inspection and repair welding robot MC23. In the first embodiment, when the defective portion of the defect rank NG4 is detected as an appearance inspection result, the inspection device 4 generates an alert screen indicating that a repair welding on a workpiece having the defective portion is not executed, and reports (notifies) the alert screen to the upper-level device 1.

The treatment of a repair welding indicates treatment contents of a repair welding corresponding to a defect rank.

A normal repair welding is executed on a defective portion of the defect rank NG1 in accordance with a repair welding program for the defect rank NG1 generated in the robot control device 3.

A normal repair welding is executed on a defective portion of the defect rank NG2 in accordance with a repair welding program for the defect rank NG2 generated in the robot control device 3. In the first embodiment, when defective portions of a plurality of defect ranks (for example, the defect ranks NG1 and NG2) are detected on a welding line of the workpiece Wk1, a repair welding is executed preferentially (firstly) from a defective portion of the defect rank NG2 having a high difficulty level of correction.

As described above, a repair welding by the inspection and repair welding robot MC23 is not executed on a defective portion of the defect rank NG3. In other words, when defect ranks (for example, the defect ranks NG1 and NG2) other than the defect rank NG3 are detected on a welding line of the same workpiece Wk1, only defective portions of the defect ranks NG1 and NG2 are subjected to a repair welding of the inspection and repair welding robot MC23, and a defective portion of the defect rank NG3 is not subject to a repair welding of the inspection and repair welding robot MC23.

As described above, in a case where at least one defective portion of the defect rank NG4 is detected on a welding line of the workpiece Wk1, even when defective portions of other defect ranks (that is, the defect ranks NG1, NG2, and NG3) are detected, the workpiece Wk1 is not subject to a repair welding of the inspection and repair welding robot MC23 nor a repair welding of a welding operator.

The inspection result storage unit 43 is configured with, for example, a hard disk (HDD) or a solid state drive (SSD). The inspection result storage unit 43 stores data or information indicating an appearance inspection result of a welded portion of the workpiece Wk1 serving as an example of data or information generated or acquired by the processor 41.

The shape detection control unit 44 serving as an example of a processing unit controls the shape detection unit 500 based on shape data of a weld bead in a welded portion that is transmitted from the shape detection unit 500 and a control signal that is related to the execution of an appearance inspection on the welded portion of the workpiece Wk1 and is transmitted from the robot control device 3. When the shape detection unit 500 is located at a position where the shape detection unit 500 can image a welded portion (in other words, a three-dimensional shape of the welded portion can be detected), the shape detection control unit 44 causes the shape detection unit 500 to emit, for example, a laser beam to acquire shape data of a weld bead in the welded portion. When the shape detection control unit 44 receives the shape data acquired by the shape detection unit 500, the shape detection control unit 44 transfers the shape data to the data processing unit 45.

The data processing unit 45 serving as an example of a processing unit converts the shape data of the weld bead in the welded portion received from the shape detection control unit 44 into image data indicating a three-dimensional shape of the welded portion. The shape data is, for example, point cloud data of a shape line including a reflection trajectory of a laser beam emitted to a surface of the weld bead. The data processing unit 45 executes a statistical processing on the input shape data, and generates image data related to the three-dimensional shape of the weld bead in the welded portion. In order to emphasize a position and a shape of the weld bead, the data processing unit 45 may execute an edge emphasis correction in which a peripheral edge portion of the weld bead is emphasized.

The determination threshold storage unit 46 stores a threshold (for example, a threshold set corresponding to a welded portion) used in a determination processing of the inspection result determination unit 47 corresponding to the welded portion. Examples of the threshold include an allowable range (threshold) related to a positional deviation of a welded portion, a threshold related to a height of a weld bead, and a threshold related to a width of a weld bead. The determination threshold storage unit 46 may store an allowable range (for example, a minimum allowable value, a maximum allowable value, or the like related to a height of a weld bead) that satisfies minimum welding quality required by a customer or the like as a threshold at the time of executing an appearance inspection after a repair welding.

The determination threshold storage unit 46 may store an upper limit value of the number of times of an appearance inspection for each welded portion or each defect rank. Accordingly, in a case where the number of times of an appearance inspection exceeds the predetermined upper limit number of times when a defective portion is corrected by a repair welding, the inspection device 4 determines that it is difficult or it is impossible to correct the defective portion by an automatic repair welding of the inspection and repair welding robot MC23, and can prevent a decrease in an operation rate of the repair welding system 1000.

The inspection result determination unit 47 serving as an example of a processing unit uses the threshold stored in the determination threshold storage unit 46 to determine whether a welded portion satisfies a predetermined welding standard based on the shape data of the weld bead in the welded portion acquired by the shape detection control unit 44. The inspection result determination unit 47 measures a position of a defective portion (for example, a start position and an end position of the defective portion, a position of a hole formed in a weld bead, a position of an undercut, and the like), and analyzes defect contents to estimate a defect factor.

In the determination described above, the inspection result determination unit 47 calculates an inspection score for each welded portion based on shape data of a weld bead in the welded portion on a welding line. The inspection result determination unit 47 determines and sets a defect rank corresponding to the inspection score to each welded portion based on the treatment determination table (see FIG. 3). The inspection result determination unit 47 generates a measured position of the defective portion, an inspection score, a defect rank, and an estimated defect factor as an appearance inspection result (determination result) for the welded portion, and transmits the generated appearance inspection result to the upper-level device 1 via the robot control device 3.

When the inspection result determination unit 47 determines that there is no defective portion, the inspection result determination unit 47 may generate an alert screen for notifying that there is no defective portion and transmit the generated alert screen to the upper-level device 1 via the robot control device 3. The alert screen transmitted to the upper-level device 1 is transmitted to and displayed on the monitor MN1.

The data processing unit 45 counts the number of times of an appearance inspection for each welded portion or defective portion, and determines that it is difficult or it is impossible to correct the defective portion by an automatic repair welding when the number of times of the appearance inspection exceeds the number of times stored in the determination threshold storage unit 46 and when the welding inspection result is not good. In this case, the inspection result determination unit 47 generates an alert screen including a position of the defective portion and a defect factor, and transmits the generated alert screen to the upper-level device 1 via the robot control device 3. The alert screen transmitted to the upper-level device 1 is displayed on the monitor MN1.

The inspection device 4 may generate an alert screen having contents other than those described above. The alert screen is transmitted to the upper-level device 1 via the robot control device 3. The alert screen transmitted to the upper-level device 1 is displayed on the monitor MN1.

Figure 4A:
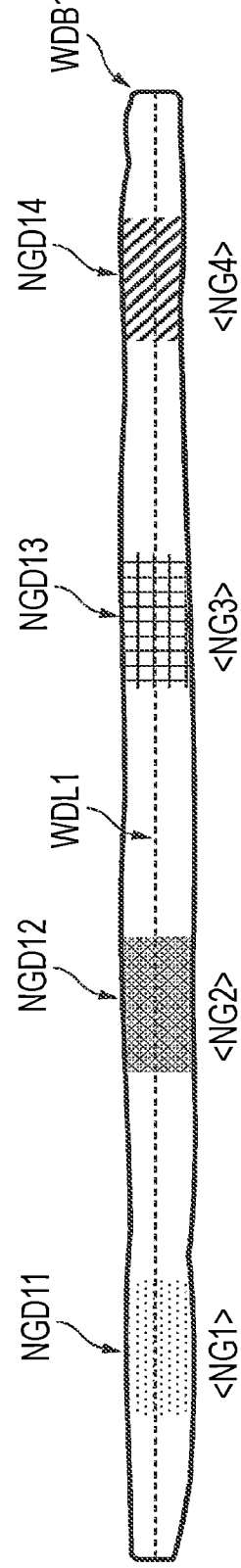
FIG. 4A is a diagram schematically showing a first example of defect ranks of welded portions of a weld bead after a main welding.
Figure 4B:
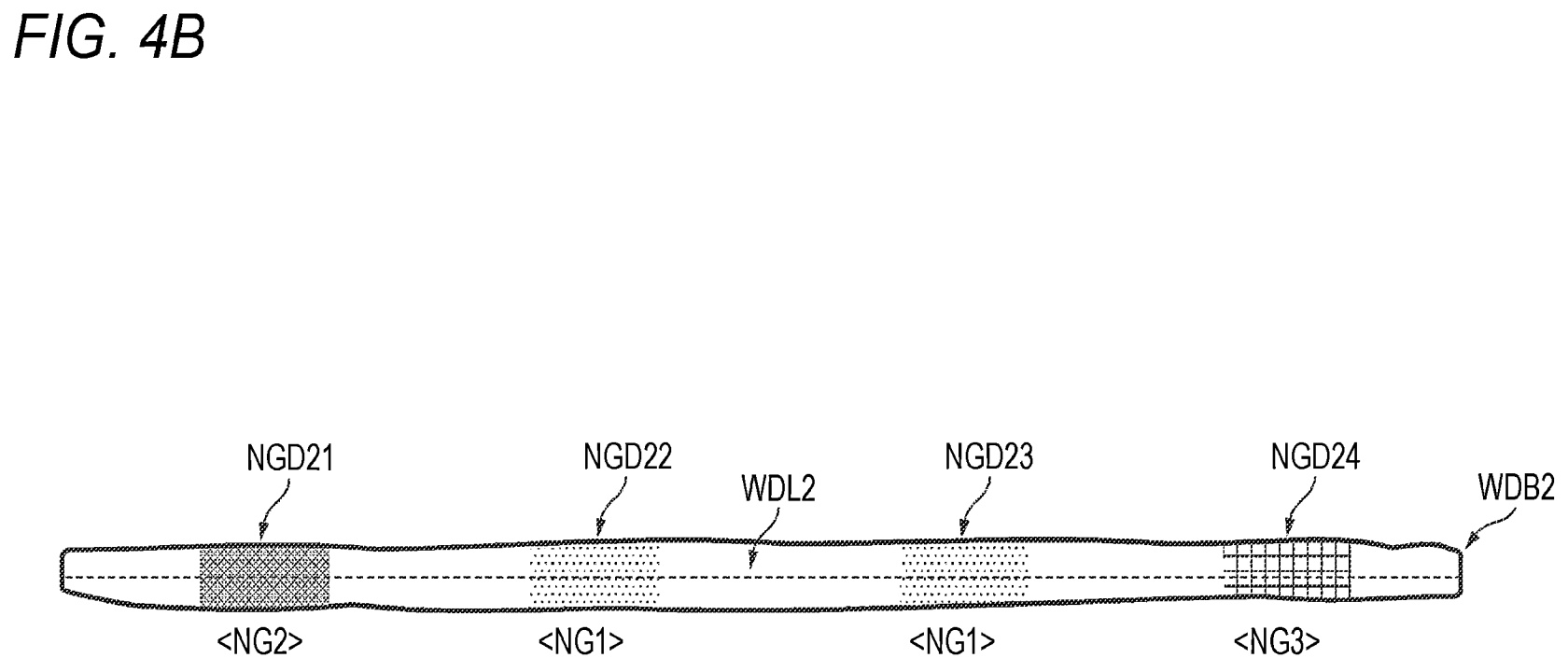
Figure 4C:
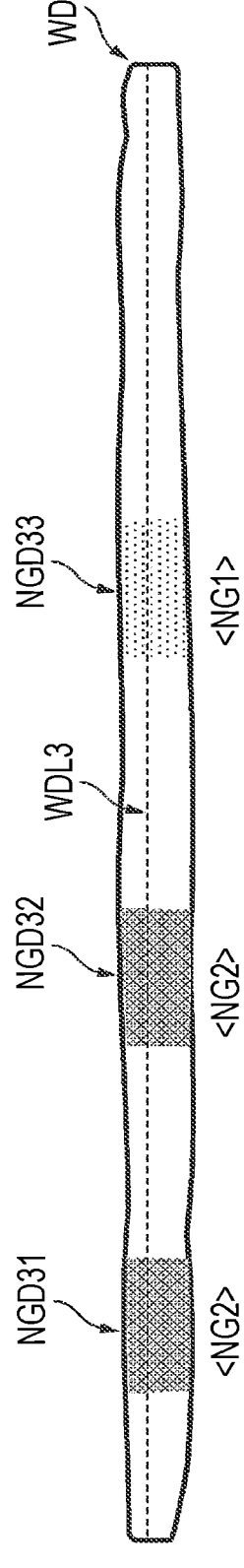
FIG. 4C is a diagram schematically showing a third example of defect ranks of welded portions of a weld bead after a main welding.

FIG. 4A is a diagram schematically showing a first example of defect ranks of welded portions of a weld bead WDB1 after a main welding. FIG. 4B is a diagram schematically showing a second example of defect ranks of welded portions of a weld bead WDB2 after a main welding. FIG. 4C is a diagram schematically showing a third example of defect ranks of welded portions of a weld bead WDB3 after a main welding. In order to make the description of FIGS. 4A to 4C easy to understand, a shape of a weld bead will be described as a substantially linear shape.

As shown in FIG. 4A, the inspection device 4 detects a plurality of defective portions NGD11, NGD12, NGD13, and NGD14 on the weld bead WDB1 based on shape data of the weld bead WDB1 on a welding line WDL1 after a main welding, and for example, calculates an inspection score of each of the defective portions. The inspection device 4 refers to the treatment determination table shown in FIG. 3, determines a defect rank corresponding to the inspection score of each defective portion, and sets the defect rank in association with the defective portion. For example, the defect rank NG1 is set to the defective portion NGD11, the defect rank NG2 is set to the defective portion NGD12, the defect rank NG3 is set to the defective portion NGD13, and the defect rank NGD4 is set to the defective portion NGD14.

As shown in FIG. 4B, the inspection device 4 detects a plurality of defective portions NGD21, NGD22, NGD23, and NGD24 on the weld bead WDB2 based on shape data of the weld bead WDB2 on a welding line WDL2 after a main welding, and for example, calculates an inspection score for each of the defective portions. The inspection device 4 refers to the treatment determination table shown in FIG. 3, determines a defect rank corresponding to the inspection score of each defective portion, and sets the defect rank in association with the defective portion. For example, the defect rank NG2 is set to the defective portion NGD21, the defect rank NG1 is set to the defective portion NGD22, the defect rank NG1 is set to the defective portion NGD23, and the defect rank NG3 is set to the defective portion NGD24.

As shown in FIG. 4C, the inspection device 4 detects a plurality of defective portions NGD31, NGD32, and NGD33 on the weld bead WDB3 based on shape data of the weld bead WDB3 on a welding line WDL3 after a main welding, and for example, calculates an inspection score for each of the defective portions. The inspection device 4 refers to the treatment determination table shown in FIG. 3, determines a defect rank corresponding to the inspection score of each defective portion, and sets the defect rank in association with the defective portion. For example, the defect rank NG2 is set to the defective portion NGD31, the defect rank NG2 is set to the defective portion NGD32, and the defect rank NG1 is set to the defective portion NGD33.

Figure 5:
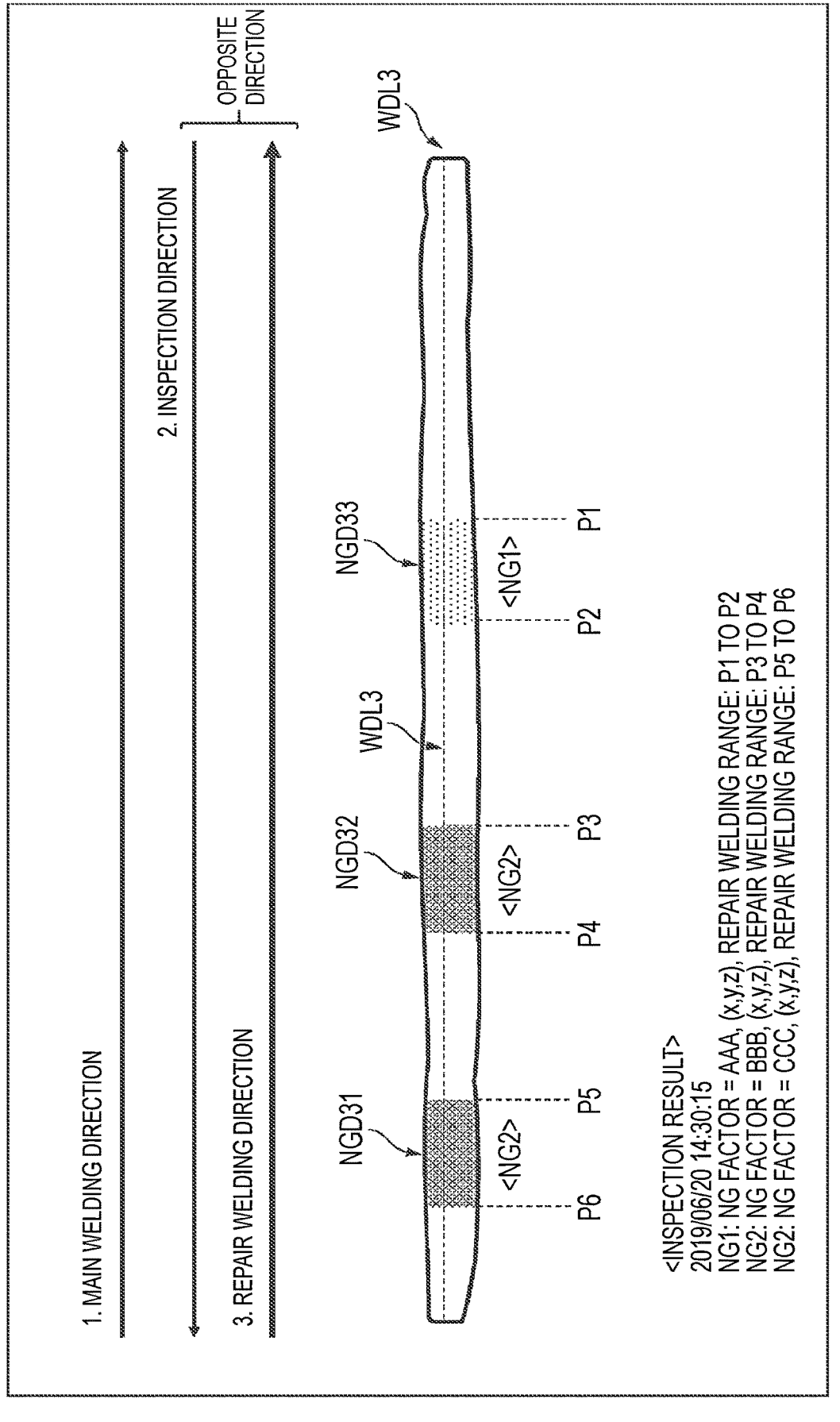
FIG. 5 is a diagram showing an example of a relationship between an inspection direction and a repair welding direction.

FIG. 5 is a diagram showing an example of a relationship between an inspection direction and a repair welding direction. In order to make the description of FIG. 5 easy to understand, FIG. 5 shows the weld bead WDB3 having a substantially linear shape as shown in FIG. 4C.

As shown in FIG. 5, for example, the inspection device 4 executes an appearance inspection in a direction that serves as a direction in which the appearance inspection is executed and that is different from a direction (more precisely, in an opposite direction) in which a main welding is executed. As an appearance inspection result at 14:30:15 on Jun. 20, 2019, the inspection device 4 determines the defect rank NG1 and a defect factor AAA that is also referred to as an NG factor for the defective portion NGD23. In response to the appearance inspection result, the robot control device 3 generates a repair welding program for setting repair welding ranges P1 and P2 where a repair welding is executed corresponding to the defective portion NGD23.

Similarly, the inspection device 4 determines the defect rank NG2 and a defect factor BBB that is also referred to as an NG factor for the defective portion NGD22. In response to the appearance inspection result, the robot control device 3 generates a repair welding program for setting repair welding ranges P3 to P4 where a repair welding is executed corresponding to the defective portion NGD22.

Similarly, the inspection device 4 determines the defect rank NG2 and a defect factor CCC that is also referred to as an NG factor for the defective portion NGD21. In response to the appearance inspection result, the robot control device 3 generates a repair welding program for setting repair welding ranges P5 to P6 where a repair welding is executed corresponding to the defective portion NGD21.

As shown in FIG. 5, the robot control device 3 generates a repair welding program so as to execute a repair welding in a direction (more precisely, in an opposite direction) different from the direction in which an appearance inspection is executed by the inspection device 4 in the first embodiment. This is because the inspection and repair welding robot MC23 executes both the appearance inspection and the repair welding, accordingly, it is not necessary to return the inspection and repair welding robot MC23 to a start position of the appearance inspection again after the appearance inspection is completed, and the repair welding can be rapidly started from an end position of the appearance inspection, so that deterioration of an operation rate of the inspection and repair welding robot MC23 can be prevented.

FIG. 6 is a diagram conceptually showing a comparison between master data and shape data of a weld bead after a main welding. One part of FIG. 6 shows the master data of a weld bead stored in the memory 42 of the inspection device 4. Here, the master data is image data obtained by the shape detection unit 500 detecting a welded portion of a workpiece that is subjected to a good main welding and imaging the welded portion. The other part of FIG. 6 shows the shape data of the weld bead of the workpiece Wk1 subjected to an appearance inspection.

For example, when an arc welding is executed on a welded portion of the workpiece Wk1, various shape defects may occur in the welded portion. For example, a hole or an undercut may occur because a part of the welded portion is melted and dropped. A length of the weld bead along a welding line, a width of the weld bead in a direction orthogonal to the welding line, and a height of the weld bead may deviate from reference values in an allowable range or more. These "hole", "undercut", "bead length", "bead width", "bead height", and the like correspond to defect factors of a welding. The defect factor is not limited to those described above.

In the inspection device 4, the data processing unit 45 calculates characteristic data based on the master data and the shape data of the weld bead of the workpiece Wk1 to be inspected for each of the defect factors. The characteristic data is data for identifying whether a welding is good or poor for each of the defect factors described above. For example, bead cuts 601 and a hole 602 are shown in FIG. 6. In each of the bead cuts 601, the length of the weld bead along the welding line is shorter than that of the master data. That is, a start position and an end position of the weld bead of the workpiece Wk1 are respectively deviated from a start position and an end position of the weld bead of the master data. The data processing unit 45 calculates a deviation amount as the characteristic data. The data processing unit 45 may calculate the length of the weld bead as the characteristic data.

Similarly, the hole 602 is in a state in which a hole is formed in the weld bead. For example, the data processing unit 45 calculates a diameter of the hole as the characteristic data. In addition, the data processing unit 45 may calculate a bead width, a size of the undercut, or the like as the characteristic data. A type of the characteristic data is not limited to those described above.

The inspection result determination unit 47 compares the characteristic data calculated as described above with a threshold stored in the determination threshold storage unit 46. An inspection score of a defective portion can be calculated by comparing the characteristic data with the threshold.

For example, the inspection result determination unit 47 may calculate an inspection score by comprehensively using a plurality of pieces of the characteristic data described above. For example, a difference between the length of the weld bead in the shape data of the workpiece Wk1 subjected to an appearance inspection and the length of the weld bead in the master data is defined as $\Delta L$. A difference between the width of the weld bead in the shape data of the workpiece Wk1 subjected to an appearance inspection and the length of the weld bead in the master data is defined as $\Delta W$. A difference between the height of the weld bead in the shape data of the workpiece Wk1 subjected to an appearance inspection and the height of the weld bead in the master data is defined as $\Delta H$. When a hole is detected in the shape data of the workpiece Wk1 subjected to an appearance inspection, a diameter of the hole is set to r. At this time, the inspection result determination unit 47 may calculate, for example, an inspection score Sc according to the following expression.

$$\text{Inspection score } Sc = (w1 \times \Delta L) + (w2 \times \Delta W) + (w3 \times \Delta W) + (w4 \times r)$$

In the above expression, w1, w2, w3, and w4 are coefficients indicating weighting (in other words, importance degree of corresponding characteristic data).

The inspection result determination unit 47 may calculate, for example, the inspection score obtained by the above-described calculation as the characteristic data. The expression described above is an example, and the inspection result determination unit 47 may calculate an inspection score using a calculation expression other than the expression described above. The inspection score may not be a single value. For example, an inspection score for a dimension (length, width, height, and the like) of the weld bead and an inspection score for a hole, an undercut, and the like may be calculated separately, and these inspection scores may be combined and may be used as a group of inspection scores.

The inspection result determination unit 47 may calculate other kinds of characteristic data. For example, shape data of a plurality of workpieces already inspected by the inspection device 4 or characteristic data calculated based on the shape data may be stored in the memory 42 or the like, and the inspection result determination unit 47 may calculate a value of a standard deviation, a variance value, or the like for the stored data as the characteristic data.

The inspection device 4 may manage information indicating a defect factor of a defective portion and the characteristic data in association with the shape data described above. That is, the inspection device 4 can manage the shape data of the workpiece Wk1 subjected to an appearance inspection in association with the characteristic data including a workpiece type, a workpiece S/N, a welding line ID, a defect factor, an inspection score, and a defect rank. The inspection device 4 may store these pieces of data in the memory 42 or the like.

FIG. 7A is a diagram showing an example of a program generation logic table corresponding to a defect type and specific data. FIG. 7B is a diagram showing an example of a program generation logic table corresponding to a defect type and an inspection score.

In the first embodiment, the inspection device 4 (for example, the data processing unit 45) generates a correction type and a correction parameter at the time of executing a repair welding on a defective portion based on a determination result of the inspection result determination unit 47. The correction type is an appropriate correction method of a defective portion (for example, a welding method the same as a main welding or various welding methods different from a main welding). The correction parameter includes a welding current A or a welding voltage V from the welding power source device 5, position information of a defective portion, an offset amount of a start position or a repair ending position of a repair welding, a welding speed S, a posture of the welding torch 400, the presence or absence of weaving, and the like.

When the data processing unit 45 generates the correction method and the correction parameter, the data processing unit 45 refers to the program generation logic table shown in FIGS. 7A and 7B from the memory 42.

In the program generation logic table in FIG. 7A, for example, the correction type and the correction parameter may be registered according to a defect factor of a defective portion estimated by the inspection result determination unit 47, a range of values of the characteristic data, and the like. The data processing unit 45 extracts a set of the correction type and the correction parameter based on the defect factor, the characteristic data, and the program generation logic table. For example, when the defect type is "hole" and values of the characteristic data (for example, a diameter) are 2 to 4, the data processing unit 45 can extract a set of the correction type and the correction parameter, that is, the correction type indicating that "a repair welding is executed twice" and the correction parameter indicating that "a data set data6 is used for a first repair welding and a data set data7 is used for a second repair welding". The above-described matter is merely an example, A, V, and S included in a data set respectively indicate a "welding current", a "welding voltage", and a "welding speed".

In the program generation logic table shown in FIG. 7B, for example, the correction type and the correction parameter may be registered according to a defect type (in other words, a defect factor) of a defective portion determined by the inspection result determination unit 47 and an inspection score. For example, when the defect type is "hole" and values of the inspection score are 40 to 59, the data processing unit 45 can extract a set of the correction type and the correction parameter, that is, the correction type indicating that "a repair welding is executed twice" and the correction parameter indicating that "a data set data6 is used for a first repair welding and a data set data7 is used for a second repair welding".

The program generation logic table described above may store data. Data may be stored in another storage area (or a storage area of the robot control device 3) or the like, and the program generation logic table may store reference information (link information) for the data.

A method of generating the correction type and the correction parameter by the data processing unit 45 is not limited to the method using the program generation logic table. For example, a welding method (correction type) may use a welding method the same as a main welding, and a parameter obtained by multiplying a parameter used in the main welding by a coefficient based on a value of an inspection score may be used as the correction parameter. More specifically, for example, when the inspection score is equal to or less than a certain value, the welding method is not changed, and a repair welding is executed using a current of 0.6 times (the coefficient is 0.6) of a current value used in a main welding.

[Processing Example of Repair Welding System 1000]

Next, an example of a processing procedure of the repair welding system 1000 according to the first embodiment will be described with reference to FIG. 8. FIG. 8 is a flowchart showing an example of a processing procedure of the repair welding system 1000 according to the first embodiment.

In FIG. 8, when the robot control device 2 receives a main welding starting command from the upper-level device 1, the main welding robot MC1 executes a main welding on a workpiece (for example, the workpiece Wk1) in accordance with a main welding basic program generated and stored in advance (St1). Similar to the repair welding basic program, the main welding basic program is a basic program prepared in advance so that all welded portions of the workpiece Wk1 can be welded under main welding conditions (for example, the welding conditions include a welding current A, a welding voltage V, and a welding speed S, and are not limited thereto) of a welding. When the main welding is completed, a completion report is transmitted from the robot control device 2 to the upper-level device 1. The workpiece Wk1 for which the main welding is completed is placed on a predetermined workpiece installation base (not shown) so that by the inspection and repair welding robot MC23 can execute an appearance inspection.

When the inspection device 4 receives an appearance inspection starting command (for example, a control signal related to the execution of an appearance inspection on welded portions of the workpiece Wk1) from the upper-level device 1, the inspection device 4 executes an appearance inspection on the welded portions of the workpiece Wk1 (St2). When the appearance inspection is completed, a completion report is transmitted from the robot control device 3 to the upper-level device 1.

The inspection device 4 determines whether there is a defective portion that does not satisfy a predetermined welding standard among the welded portions of the workpiece Wk1. When the inspection device 4 detects a defective portion, the inspection device 4 measures a position of the defective portion (for example, a start position and an end position of the defective portion, a position of a hole generated in a weld bead, a position of an undercut, and the like), analyzes defect contents to estimate a defect factor, and determines and sets a defect rank corresponding to an inspection score for each welded portion based on the treatment determination table (see FIG. 3).

When no defective portion is detected among the welded portions of the workpiece Wk1 (St3, NO), the inspection device 4 generates an appearance inspection result indicating that there is no unqualified portion, and transmits the appearance inspection result to the upper-level device 1 via the robot control device 3. In this case, the processing of the repair welding system 1000 is ended. As described above, when the inspection score (for example, 0 to 100) is 80 to 100, the appearance inspection shows a qualified result, and when the inspection score is 79 or less, the appearance inspection shows an unqualified result. A threshold for determining whether a result of the appearance inspection is qualified is not limited to 80 or more.

On the other hand, when the inspection device 4 detects an unqualified portion (defective portion) among the welded portions of the workpiece Wk1 (St3, YES), the inspection device 4 determines whether a defect rank corresponding to an inspection score of the unqualified portion is NG4 (St4). When it is determined that the defect rank of the defective portion is NG4 (St4, YES), the inspection device 4 generates an alert screen indicating that a repair welding is not executed on the workpiece Wk1 since the inspection and repair welding robot MC23 or a welding operator cannot correct the workpiece Wk1 even when a repair welding is executed on the workpiece Wk1 (see FIG. 3), and reports the alert screen to the upper-level device 1 via the robot control device 3 (St5). In this case, the processing of the repair welding system 1000 is ended.

On the other hand, when the inspection device 4 determines that the defect rank of the unqualified portion (defective portion) is not NG4 (St4, NO), the inspection device 4 determines whether the defect rank corresponding to the inspection score of defective portion is NG3 (St6). When the inspection device 4 determines that the defect rank of the defective portion is NG3 (St6, YES), the inspection device 4 generates an alert screen indicating that a repair welding on the defective portion of the defect rank NG3 is performed by a manual repair welding of a welding operator instead of the inspection and repair welding robot MC23, and reports the alert screen to the upper-level device 1 via the robot control device 3 (St7).

On the other hand, when it is determined that the defect rank of the unqualified portion (defective portion) is not NG3 (St6, NO), the inspection device 4 determines whether the defect rank corresponding to the inspection score of the defective portion is NG2 (St8). When it is determined that the defect rank of the defective portion is NG2 (St8, YES), the inspection device 4 determines whether the number of times of an appearance inspection on the defective portion of the defect rank NG2 is equal to or less than a predetermined number of times N (N: a predetermined value of 2 or more) (St9). When it is determined that the number of times of an appearance inspection on the defective portion of the defect rank NG2 is larger than the predetermined number of times N (St9, NO), the inspection device 4 determines that a repair welding on the defective portion of the defect rank NG2 is executed N times but failed, generates an alert screen indicating that the inspection and repair welding robot MC23 does not execute a repair welding on the defective portion, and reports the alert screen to the upper-level device 1 via the robot control device 3 (St13).

On the other hand, when it is determined that the number of times of an appearance inspection on the defective portion of the defect rank NG2 is equal to or less than the predetermined number of times N (St9, YES), the inspection device 4 repeats a repair welding on the defective portion of the defect rank NG2 until the repair welding is executed N times, generates a generation instruction of a repair welding program for executing a repair welding on the defective portion of only the defect rank NG2 in a weld bead on a welding line of the workpiece Wk1 subject to an appearance inspection, and transmits the generation instruction to the robot control device 3. Based on the generation instruction transmitted from the inspection device 4, the robot control device 3 generates a repair welding program for executing a repair welding on the defective portion of only the defect rank NG2 in the weld bead on the welding line of the workpiece Wk1 subjected to the appearance inspection (St10). The robot control device 3 controls a processing of the inspection and repair welding robot MC23 in accordance with the repair welding program, and executes a repair welding on the defective portion of only the defect rank NG2 (St14). When the repair welding is completed, a completion report is transmitted from the robot control device 3 to the upper-level device 1. After the repair welding is executed, the processing of the repair welding system 1000 returns to step St2, and the repair welding is repeated N times at maximum until an appearance inspection result of the defective portion of the defect rank NG2 is determined to be qualified.

On the other hand, when it is determined that the defect rank of the defective portion is not NG2 (St8, NO), the inspection device 4 can determine that the defect rank of the defective portion is NG1, and determines whether the number of times of an appearance inspection on the defective portion of the defect rank NG1 is equal to or less than a predetermined number of times N (N: a predetermined value of 2 or more) (St12). When it is determined that the number of times of an appearance inspection on the defective portion of the defect rank NG1 is larger than the predetermined number of times N (St12, NO), the inspection device 4 determines that a repair welding on the defective portion of the defect rank NG1 is executed N times but failed, generates an alert screen indicating that the inspection and repair welding robot MC23 does not execute a repair welding on the defective portion, and reports the alert screen to the upper-level device 1 via the robot control device 3 (St13).

On the other hand, when it is determined that the number of times of an appearance inspection on the defective portion of the defect rank NG1 is equal to or less than the predetermined number of times N (St12, YES), the inspection device 4 repeats a repair welding on the defective portion of the defect rank NG1 until the repair welding is executed N times, generates a generation instruction of a repair welding program for executing a repair welding on the defective portion of only the defect rank NG1 in a weld bead on a welding line of the workpiece Wk1 subject to an appearance inspection, and transmits the generation instruction to the robot control device 3. Based on the generation instruction transmitted from the inspection device 4, the robot control device 3 generates a repair welding program for executing a repair welding on the defective portion of only the defect rank NG1 in the weld bead on the welding line of the workpiece Wk1 subjected to the appearance inspection (St11). The robot control device 3 controls a processing of the inspection and repair welding robot MC23 in accordance with the repair welding program, and executes a repair welding on the defective portion of only the defect rank NG1 (St14). When the repair welding is completed, a completion report is transmitted from the robot control device 3 to the upper-level device 1. After the repair welding is executed, the processing of the repair welding system 1000 returns to step St2, and the repair welding is repeated N times at maximum until an appearance inspection result of the defective portion of the defect rank NG1 is determined to be qualified.

Although a series of processings from steps St3 to St9, St12, and St13 are described as processings executed by the inspection device 4 in FIG. 8, these processings may be executed by the robot control device 3 that receives data or information of an appearance inspection result from the inspection device 4.

As described above, the repair welding system 1000 according to the first embodiment includes the inspection device 4 configured to inspect an appearance of a welded portion of the workpiece (for example, the workpiece Wk1), and the robot control device 3 that controls the inspection and repair welding robot MC23 configured to weld the workpiece Wk1. The inspection device 4 determines whether there is a defective portion among the welded portions of the workpiece Wk1 according to a predetermined standard (refer to the above description), and sets one of a plurality of defect ranks (for example, NG1 to NG4) for the defective portion when the defective portion is detected. The robot control device 3 generates a repair welding program corresponding to the defect rank, and instructs the inspection and repair welding robot MC23 to execute, in accordance with the repair welding program, a repair welding on the defective portion to which the defect rank is set.

Accordingly, in the repair welding system 1000, the inspection and repair welding robot MC23 can more efficiently execute the repair welding automatically based on an appearance inspection result of a weld bead on a welding line of the workpiece Wk1 that is main welded. That is, since a frequency of executing a repair welding manually by a welding operator or the like as in the related art is minimized, the repair welding system 1000 can more efficiently execute a required repair welding on the workpiece Wk1.

After executing the repair welding, the robot control device 3 instructs the inspection device 4 to inspect an appearance of a defective portion on which the repair welding is executed. Accordingly, since the inspection device 4 executes an appearance inspection on the defective portion on which the repair welding is executed, it is possible to quickly determine whether the defective portion present in the workpiece Wk1 is well repaired and welded and whether the defective portion is properly corrected, and it is possible to more efficiently execute the repair welding on the workpiece Wk1.

When there are a plurality of defective portions in the workpiece Wk1 and a plurality of different defect ranks (for example, NG1 and NG2) are set to the defective portions by the inspection device 4, the robot control device 3 generates a repair welding program preferentially for a defective portion to which a defect rank (for example, NG2) having a high difficulty level of repair welding is set. As a result, the repair welding system 1000 can determine whether a defective portion can be recovered by a correction at an early stage by executing a repair welding preferentially on a defective portion having a high difficulty level (in other words, having a low recovery probability) only, and can execute the recovery in a short time, so that the repair welding on the workpiece Wk1 can be executed efficiently in a comprehensive manner.

The robot control device 3 generates a repair welding program corresponding to the defect rank NG2 when the defect rank NG2 indicating a severe welding defect among the plurality of defect ranks (for example, NG1 to NG4) is set by the inspection device 4. The robot control device 3 instructs the inspection and repair welding robot MC23 to execute a repair welding on a defective portion for a plurality of times (for example, a predetermined number of times N) based on the repair welding program corresponding to the defect rank NG2. Accordingly, for example, when different defect ranks (for example, NG1 and NG2) are mixed for a plurality of defective portions, the repair welding system 1000 can intensively execute a repair welding only on the defective portion to which the defect rank NG2 indicating a severe welding defect is set, so that the operation efficiency of the inspection and repair welding robot MC23 can be improved and a repair welding on the workpiece Wk1 can be executed efficiently in a comprehensive manner.

The robot control device 3 generates a repair welding program corresponding to the defect rank NG1 indicating that a welding defect having a minor degree compared with the defect rank NG2 after the defective portion of the defect rank NG2 is corrected by executing the repair welding for a plurality of times based on the repair welding program corresponding to the defect rank NG2. The robot control device 3 instructs the inspection and repair welding robot MC23 to execute a repair welding on the defective portion for a plurality of times based on the repair welding program corresponding to the defect rank NG1. Accordingly, for example, when different defect ranks (for example, NG1 and NG2) are mixed for a plurality of defective portions, the repair welding system 1000 can intensively execute a repair welding only on a defective portion to which the defect rank NG1 indicating a minor welding defect is set after the defective portion of the defect rank NG2 indicating a severe welding defect is corrected by a repair welding, so that the operation efficiency of the inspection and repair welding robot MC23 can be improved and a repair welding on the workpiece Wk1 can be executed efficiently in a comprehensive manner.

The robot control device 3 generates a repair welding program corresponding to the defect rank NG1 when the defect rank NG1 indicating a minor welding defect among the plurality of defect ranks is set by the inspection device 4. The robot control device 3 instructs the inspection and repair welding robot MC23 to execute a repair welding on the defective portion for a plurality of times based on the repair welding program corresponding to the defect rank NG1. Accordingly, the repair welding system 1000 can intensively execute a repair welding only on the defective portion to which the defect rank NG1 indicating a minor welding defect is set, so that the operation efficiency of the inspection and repair welding robot MC23 can be improved and a repair welding on the workpiece Wk1 can be executed efficiently in a comprehensive manner.

When the inspection device 4 sets the defect rank NG3 indicating that it is difficult to correct the workpiece Wk1 by a repair welding of the inspection and repair welding robot MC23 among a plurality of defect ranks, the robot control device 3 notifies the upper-level device 1 of an alert (for example, an alert screen) indicating that it is difficult for the inspection and repair welding robot MC23 to execute a repair welding on the workpiece Wk1. Accordingly, when the repair welding system 1000 detects a defective portion of the defect rank NG3, the repair welding system 1000 notifies an alert screen indicating that a repair welding is performed by a welding operator instead of the inspection and repair welding robot MC23, so that the repair welding system 1000 can intentionally exclude the inspection and repair welding robot MC23 from a target for executing a repair welding, and thus the repair welding system 1000 can improve the operation efficiency of the inspection and repair welding robot MC23 and improve the efficiency of a repair welding.

When the inspection device 4 sets the defect rank NG4 indicating that it is difficult for the inspection and repair welding robot MC23 and a welding operator to perform a correction by a repair welding among the plurality of defect ranks, the robot control device 3 notifies the upper-level device 1 of an alert (for example, an alert screen) indicating that it is impossible to execute a repair welding on the workpiece Wk1. Accordingly, when a defective portion of the defect rank NG4 is detected, the repair welding system 1000 does not cause the inspection and repair welding robot MC23 or a welding operator to perform a repair welding, and positively gives up the repair welding on the workpiece Wk1, so that the repair welding system 1000 can improve the operation efficiency of the inspection and repair welding robot MC23.

The robot control device 3 determines to execute a repair welding on a defective portion of a welded portion of the workpiece Wk1 in a direction different from a direction in which the inspection device 4 inspects an appearance of the welded portion of the workpiece Wk1. Accordingly, the robot control device 3 does not need to return the inspection and repair welding robot MC23 to a start position of the appearance inspection again after the appearance inspection is completed, and can cause the inspection and repair welding robot MC23 to rapidly start the repair welding from an end position of the appearance inspection, so that the deterioration of the operation rate of the inspection and repair welding robot MC23 can be prevented.

Second Embodiment

An example has been described in the first embodiment in which a first robot for executing an appearance inspection on a workpiece after a main welding and a second robot for executing a repair welding on a defective portion of the workpiece subjected to the appearance inspection are implemented by the same robot (that is, the inspection and repair welding robot MC23). The first robot and the second robot may be configured as different robots. An example of a repair welding system 1001 in which the first robot and the second robot described above are implemented by different robots will be described in the second embodiment.

FIG. 9 is a diagram showing an example of an internal configuration of the repair welding system 1001 related to the control of the inspection robot MC2 and the repair welding robot MC3 according to the second embodiment. FIG. 10 is a diagram showing an example of an internal configuration of the repair welding system 1001 related to the control of the inspection robot MC2 and the repair welding robot MC3 according to the second embodiment. In FIGS. 9 and 10, the same components as those shown in FIGS. 1 and 2 are denoted by the same reference numerals, description thereof will be simplified or omitted, and different contents will be described.

As shown in FIG. 9, the inspection robot MC2 operates the manipulator 201 by using position information based on an inspection coordinate system ΣW1 in accordance with various control signals transmitted from a robot control device 3a, so that a shape detection unit 501 scans a workpiece Wk2 and the inspection robot MC2 executes an appearance inspection on the workpiece Wk2. The repair welding robot MC3 executes a repair welding on the workpiece Wk2 by operating the manipulator 202 using position information based on a repair welding coordinate system ΣW2 in accordance with various control signals transmitted from the robot control device 2.

In the second embodiment, each of the inspection robot MC2 and the repair welding robot MC3 execute a processing (that is, an appearance inspection and a repair welding) on the workpiece Wk2 placed on a common workpiece installation base. In the first embodiment, a position of the workpiece Wk1 as viewed from the inspection and repair welding robot MC23 can be specified using the same coordinate system at the time of executing a processing of an appearance inspection and a processing of a repair welding. The second embodiment is different from the first embodiment in that a position of the workpiece Wk2 as viewed from the inspection robot MC2 (in other words, a coordinate system) is different from a position of the workpiece Wk2 as viewed from the repair welding robot MC3 (in other words, a coordinate system).

Therefore, in the second embodiment, the repair welding robot MC3 cannot execute a repair welding by using position information of a defective portion obtained according to the inspection coordinate system ΣW1 of the inspection robot MC2. That is, the repair welding robot MC3 needs to convert the position information of the defective portion obtained according to the inspection coordinate system ΣW1 of the inspection robot MC2 into position information that can be specified in the repair welding coordinate system ΣW2 of the repair welding robot MC3. The conversion of the position information (in other words, the coordinate system) may be executed by the robot control device 3a or may be executed by the robot control device 2.

[Configuration Example of Robot Control Device 2]

The robot control device 2 is a control device for controlling the repair welding robot MC3 to execute a main welding and a repair welding. That is, the main welding according to the second embodiment may be executed using the repair welding robot MC3. The main welding and the repair welding may be executed by separate robots (that is, the main welding robot MC1 and the repair welding robot MC3).

The robot control device 2 controls each of the manipulator 202, the wire feeding device 300, and the welding power source device 5 based on a control signal transmitted from the upper-level device 1. The robot control device 2 includes a communication unit 20, a processor 21, a memory 22, and a program storage unit 23. The processor 21 can implement functions of a program calling unit 24a, a program generation unit 24b, a welding power source control unit 25, a robot control unit 26, a calculation unit 27, a conversion matrix storage unit 28, and a coordination conversion unit 29, in cooperation with the memory 22.

The communication unit 20 is communicably connected to the upper-level device 1. The communication unit 20 receives various control signals (for example, a control signal related to the execution of a main welding on the workpiece Wk2, a control signal related to the execution of a repair welding on a defective portion among welded portions of the workpiece Wk2) transmitted from the upper-level device 1, and information necessary for a main welding and a repair welding (for example, a welding method, position information, and the like for each welded portion).

The processor 21 is configured with, for example, a CPU or an FPGA, and executes various processings and controls in cooperation with the memory 22. Specifically, the processor 21 implements functions of units by referring to a program and data stored in the memory 22 and executing the program. The units are the program calling unit 24a, the program generation unit 24b, the welding power source control unit 25, the robot control unit 26, the calculation unit 27, the conversion matrix storage unit 28, and the coordinate conversion unit 9.

The memory 22 includes, for example, a RAM serving as a work memory used when each processing of the processor 21 is executed, and a ROM that stores a program and data for defining an operation of the processor 21. Data or information generated or acquired by the processor 21 is temporarily stored in the RAM. A program that defines an operation of the processor 21 is written into the ROM. The memory 22 also stores information of the repair welding coordinate system ΣW2 preset in the repair welding robot MC3.

The program storage unit 23 stores a main welding basic program and a repair welding basic program prepared in advance. The main welding basic program is a basic program for executing a main welding, and is a control program for controlling the welding power source device 5, the manipulator 202, the wire feeding device 300, the welding torch 401, and the like. The program storage unit 23 may store a welding sequence of a main welding and a repair sequence of a repair welding. Accordingly, the repair welding system 1001 can execute a repair welding more efficiently.

The program calling unit 24a calls the main welding basic program or the repair welding basic program from the program storage unit 23 based on a control signal transmitted from the upper-level device 1 via the communication unit 20.

The program generation unit 24b edits the repair welding basic program called by the program calling unit 24a based on information (for example, an appearance inspection result of the inspection device 1) that is related to a defective portion and is received from the upper-level device 1 via the communication unit 20, and generates a repair welding program corresponding to the defective portion of a specific defect rank. That is, the program generation unit 24b generates a repair welding program that determines a defective portion to be subjected to a repair welding among all welded portions of the workpiece Wk2 by using the information related to the defective portion (for example, a position of the defective portion, a defect rank, a defect factor, and a correction parameter for a repair welding). The generated repair welding program may be stored in the program storage unit 23 or may be stored in a RAM or the like in the memory 22.

When the program generation unit 24b generates the repair welding program, the program generation unit 24b generates the repair welding program by using position information of the defective portion in the repair welding coordinate system 2W2 input from the coordinate conversion unit 29 or the communication unit 20. The program generation unit 24b generates the repair welding program for setting a repair sequence for executing a repair welding different from an inspection sequence of a welded portion. Accordingly, the repair welding system 1001 can efficiently execute a repair welding in accordance with the number and positions of defective portions. Therefore, the repair welding system 1001 can furthermore efficiently execute a repair welding on a welded portion.

The calculation unit 27 executes a calculation for controlling the manipulator 202 and the wire feeding device 300 by the robot control unit 26 and a calculation for controlling the welding power source device 5 by the welding power source control unit 25 based on the main welding basic program or the repair welding program input from the program generation unit 24b. For example, the calculation unit 27 calculates an offset amount necessary for a repair welding based on position information of a defective portion. The calculation unit 27 outputs the repair welding program including the calculation result to the welding power source control unit 25 and the robot control unit 26.

The robot control unit 26 generates a control signal for controlling the manipulator 202 and the wire feeding device 300 based on the main welding program or the repair welding program output from the calculation unit 27. The robot control unit 26 controls the manipulator 202 and the wire feeding device 300 based on the generated control signal.

The conversion matrix storage unit 28 stores a conversion matrix for converting position information (coordinate information) of a defective portion based on the inspection coordinate system ΣW1 acquired by the inspection device 4 into position information (coordinate information) based on the repair welding coordinate system ΣW2 in which the repair welding robot MC3 can execute a repair welding. The conversion matrix is derived in advance and stored in the conversion matrix storage unit 28. Specifically, the conversion matrix storage unit 28 derives a conversion matrix based on position information (coordinate information) based on respective coordinate systems obtained by the repair welding coordinate system ΣW2 and the inspection coordinate system ΣW1 in a state in which the welding torch 401 held by the repair welding robot MC3 and the shape detection unit 501 held by the inspection robot MC2 are respectively positioned at positions (control points) of three different points relative to the common workpiece Wk2 placed on a workpiece installation base. The coordinate conversion unit 29 refers to the stored conversion matrix.

The coordinate conversion unit 29 refers to the conversion matrix stored in the conversion matrix storage unit 28, and converts the position information (coordinate information) of the defective portion acquired by the inspection device 4 into position information (coordinate information) based on the repair welding coordinate system ΣW2 in which the repair welding robot MC3 can execute a repair welding. The coordinate conversion unit 29 outputs the converted position information of the defective portion based on the repair welding coordinate system ΣW2 to the program generation unit 24b. The conversion matrix storage unit 28 and the coordinate conversion unit 29 may be omitted when the robot control device 3 converts the position information (coordinate information) of the defective portion based on the inspection coordinate system ΣW1 into the position information (coordinate information) based on the repair welding coordinate system ΣW2 in which the repair welding robot MC3 can execute a repair welding.

[Configuration Example of Robot Control Device 3*a*]

Similar to the first embodiment, the robot control device 3*a* controls the inspection device 4 based on a control signal transmitted from the upper-level device 1. The robot control device 3*a* includes the communication unit 30, a processor 31*a*, the memory 32, and the program storage unit 33. The processor 31*a* can implement functions of the program calling unit 34*a*, the program generation unit 34*b*, the inspection device control unit 35, the robot control unit 36, the calculation unit 37, a conversion matrix storage unit 39*a*, and a coordination conversion unit 39*b*, in cooperation with the memory 32. When describing the robot control device 3*a*, the same components as those of the robot control device 3 according to the first embodiment are denoted by the same reference numerals, description thereof will be simplified or omitted, and different contents will be described.

The processor 31*a* is configured with, for example, a CPU or an FPGA, and executes various processings and controls in cooperation with the memory 32. Specifically, the processor 31*a* implements functions of units by referring to a program and data stored in the memory 32 and executing the program. The units are the program calling unit 34*a*, the program generation unit 34*b*, the inspection device control unit 35, the robot control unit 36, the calculation unit 37, the conversion matrix storage unit 39*a*, and the coordinate conversion unit 39*b*.

The memory 32 includes, for example, a RAM serving as a work memory used when each processing of the processor 31*a* is executed, and a ROM that stores a program and data for defining an operation of the processor 31*a*. Data or information generated or acquired by the processor 31*a* is temporarily stored in the RAM. A program that defines an operation of the processor 31*a* is written into the ROM. The memory 32 stores information about the inspection coordinate system ΣW1 set in advance in the inspection robot MC2.

The calculation unit 37 executes a calculation for controlling the inspection device 4 and the shape detection unit 501 by the inspection device control unit 35 based on an inspection program input from the program generation unit 34*b*. For example, the calculation unit 37 calculates an imaging position and an imaging distance at which an imaging region including a welded portion and the periphery of the welded portion can be imaged, based on position information of the welded portion.

The robot control unit 36 executes a control based on the inspection coordinate system ΣW1 preset in the inspection robot MC2 based on a calculation result of the calculation unit 37 and the inspection program generated by the program generation unit 34*b*. The robot control unit 36*a* generates a control signal for controlling the manipulator 201 and executes a control.

When the robot control device 2 does not convert position information (coordinate information) of a defective portion based on the inspection coordinate system ΣW1 into position information (coordinate information) based on the repair welding coordinate system ΣW2 in which the repair welding robot MC3 can execute a repair welding, the robot control device 3*a* may include the conversion matrix storage unit 39*a* and the coordinate conversion unit 39*b*.

The conversion matrix storage unit 39*a* derives and stores a conversion matrix for converting the position information (coordinate information) of the defective portion based on the inspection coordinate system ΣW1 into the position information (coordinate information) based on the repair welding coordinate system ΣW2 in which the repair welding robot MC3 can execute a repair welding. Specifically, the conversion matrix storage unit 39*a* derives a conversion matrix based on position information (coordinate information) based on respective coordinate systems obtained by the repair welding coordinate system ΣW2 and the inspection coordinate system ΣW1 in a state in which the welding torch 401 held by the repair welding robot MC3 and the shape detection unit 501 held by the inspection robot MC2 are respectively positioned at positions of three different points relative to the same workpiece Wk2. The coordinate conversion unit 39*b* refers to the stored conversion matrix.

The coordinate conversion unit 39*b* refers to the conversion matrix stored in the conversion matrix storage unit 39*a*, and converts the position information (coordinate information) of the defective portion acquired by the inspection device 4 into position information (coordinate information) based on the repair welding coordinate system ΣW2 in which the repair welding robot MC3 can execute a repair welding. The coordinate conversion unit 39*b* generates an inspection result based on the position information of the defective portion based on the repair welding coordinate system ΣW2, and transmits the inspection result to the robot control device 2 via the upper-level device 1.

Since a processing procedure of the repair welding system 1001 according to the second embodiment is the same as the processing procedure according to the first embodiment shown in FIG. 8, description thereof will be omitted. In the second embodiment, since the inspection robot MC2 and the repair welding robot MC3 are separate bodies, when the repair welding programs corresponding to the defect ranks NG2 and NG1 are generated, the robot control device 2 or the robot control device 3 converts the position information based on the inspection coordinate system ΣW1 of the defective portion obtained as an appearance inspection result into the position information based on the repair welding coordinate system ΣW2 of the defective portion on which a repair welding is to be executed (steps St10 and St11).

As described above, in the repair welding system 1001 according to the second embodiment, when an appearance inspection on a weld bead after a main welding and a repair welding on a defective portion are executed by separate robots, the appearance inspection on the welded portion and the repair welding on the defective portion can be efficiently executed in a similar manner to that in the first embodiment, and thus the repair welding on the workpiece Wk2 can be efficiently executed.

Although various embodiments are described above with reference to the drawings, it is needless to say that the present invention is not limited to such examples. It will be apparent to those skilled in the art that various alterations, modifications, substitutions, additions, deletions, and equivalents can be conceived within the scope of the claims, and it should be understood that such changes also belong to the technical scope of the present invention. Components in the embodiments described above may be combined freely within a range not departing from the spirit of the invention.

The present disclosure is useful as a repair welding method, an inspection device, and a robot control device that can more efficiently execute a repair welding on a defective portion of a weld bead.

What is claimed is:

1. A repair welding method executed by a repair welding system including an inspection device configured to inspect an appearance of a welded portion of a workpiece and a robot control device that controls a robot configured to weld the workpiece, the repair welding method comprising:

determining whether there is a defective portion among at least one welded portion of the workpiece based on a predetermined standard;

setting one of a plurality of defect ranks to the defective portion in a case that the defective portion is detected, the plurality of defect ranks including at least two defect ranks having respectively corresponding repair welding programs for the robot to execute repair welding;

generating a repair welding program corresponding to the defect rank; and instructing the robot to execute, in accordance with the repair welding program, a repair welding on a defective portion specified by the defect rank.

2. The repair welding method according to claim 1, further comprising after the repair welding is executed, instructing the inspection device to inspect an appearance of the defective portion on which the repair welding is executed.

3. The repair welding method according to claim 1, wherein in a case that there are a plurality of defective portions in the workpiece and the setting comprises setting different defect ranks to the defective portions based on defect severity, the generating of the repair welding program comprises first generating the repair welding program for one of the defective portions to which the defect rank having a higher difficulty level of repair welding is set.

4. The repair welding method according to claim 1, wherein the plurality of defect ranks include a first defect rank, a second defect rank, and a third defect rank, the first defect rank indicating a lowest level of welding defect, the second defect rank indicating a higher level of welding defect than the first defect rank, and the third defect rank indicating a higher level of welding defect than the second defect rank, and wherein in a case that the third defect rank is set to the defective portion, the repair welding method further comprises notifying a peripheral device of an alert.

5. The repair welding method according to claim 1, wherein the plurality of defect ranks include a first defect rank, a second defect rank, a third defect rank, and a fourth defect rank, the first defect rank indicating a lowest level of welding defect, the second defect rank indicating a higher level of welding defect than the first defect rank, the third defect rank indicating a higher level of welding defect than the second defect rank, and the fourth defect rank indicating a higher level of welding defect than the third defect rank, and wherein in a case that the fourth defect rank is set to the defective portion, the repair welding method further comprises notifying a peripheral device of an alert indicating that it is impossible to execute a repair welding on the workpiece.

6. The repair welding method according to claim 1, wherein the instructing comprises instructing the robot to execute the repair welding on the defective portion among the at least one welded portion of the workpiece in a direction different from a direction in which an appearance of the at least one welded portion is inspected.

7. An inspection device configured to be connected to a robot control device for controlling a robot configured to weld a workpiece and configured to inspect an appearance of a welded portion of the workpiece, the inspection device comprising:

a processing unit configured to determine whether there is a defective portion among at least one welded portion of the workpiece based on a predetermined standard, and set one of a plurality of defect ranks to the defective portion in a case that the defective portion is detected, the plurality of defect ranks including at least two defect ranks having respectively corresponding repair welding programs for the robot to execute repair welding; and a communication unit configured to send, to the robot control device, an instruction for generating a repair welding program corresponding to the defect rank and an instruction for instructing the robot to execute, in accordance with the repair welding program, a repair welding on the defective portion to which the defect rank is set.

* * * * *